(12) United States Patent
Bakker et al.

(10) Patent No.: US 11,993,968 B2
(45) Date of Patent: May 28, 2024

(54) AUTOMOTIVE VEHICLE SLIDING SIDE DOOR WITH DUAL GUIDE RAIL

(71) Applicant: Rivian IP Holdings, LLC, Plymouth, MI (US)

(72) Inventors: Chass Bakker, Clarkston, MI (US); Brian Gase, Ypsilanti, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 715 days.

(21) Appl. No.: 16/810,693

(22) Filed: Mar. 5, 2020

(65) Prior Publication Data
US 2021/0277695 A1 Sep. 9, 2021

(51) Int. Cl.
| | | |
|---|---|---|
| *E05D 15/10* | (2006.01) | |
| *B60J 5/06* | (2006.01) | |
| *E05D 15/30* | (2006.01) | |
| *E05F 15/646* | (2015.01) | |

(52) U.S. Cl.
CPC .............. *E05D 15/101* (2013.01); *B60J 5/06* (2013.01); *E05D 15/30* (2013.01); *E05F 15/646* (2015.01); *E05Y 2900/531* (2013.01)

(58) Field of Classification Search
CPC ....... E05D 15/30; E05D 15/101; E05F 15/646
See application file for complete search history.

(56) References Cited

U.S. PATENT DOCUMENTS

| | | | | |
|---|---|---|---|---|
| 6,036,257 | A * | 3/2000 | Manuel | E05D 15/1081 49/213 |
| 6,328,374 | B1* | 12/2001 | Patel | E05D 15/1047 49/213 |
| 6,932,417 | B2* | 8/2005 | Barczynski | B60J 5/06 49/213 |
| 9,163,443 | B2* | 10/2015 | Yun | E05D 15/10 |
| 2009/0230721 | A1* | 9/2009 | Rusnak | E05D 15/1047 296/146.5 |
| 2010/0289299 | A1* | 11/2010 | Kitayama | E05D 15/1047 49/213 |
| 2015/0183303 | A1* | 7/2015 | Choi | B60J 5/06 49/404 |
| 2018/0171693 | A1* | 6/2018 | Vega | E05D 15/0604 |

\* cited by examiner

*Primary Examiner* — Gregory J Strimbu
(74) *Attorney, Agent, or Firm* — Haley Guiliano LLP

(57) ABSTRACT

A dual-guide-rail sliding door system for an automotive vehicle includes a sliding door movably connected to a body of the vehicle; a front rail connected to the body of the vehicle; a rear rail connected to the body of the vehicle rearward of the front rail; a door rail connected to the sliding door; a front arm assembly connected to the sliding door and movably connected to the front rail; and a rear arm assembly movably connected to the rear rail and movably connected to the door rail. A lateral distance travelled by the sliding door along the body of the vehicle from an open position to a closed position is greater than a length of the rear rail.

18 Claims, 38 Drawing Sheets

AUTOMOTIVE VEHICLE SLIDING SIDE DOOR WITH DUAL GUIDE RAIL

TECHNICAL FIELD

The present disclosure relates to doors for automotive vehicles.

BACKGROUND

The statements in this section merely provide background information related to the present disclosure and may not constitute prior art.

Automotive vehicles typically have multiple doors for ingress and egress of vehicle occupants. For some vehicles, especially for larger vehicles such as minivans, a sliding door is sometimes used together with or instead of conventional swing doors. A sliding door may have various benefits over a hinged door, including functional benefits, ease of access, reduced outboard door swing, and avoidance of obstructions next to the vehicle.

Implementation of a sliding door design entails provision of sufficient space for the door mechanism and its components and may be limited depending on the vehicle type and styling considerations. In some instances, space constraints for various automotive vehicles may not permit for the utilization of a conventional sliding door mechanism. For example, space at the rear of the vehicle may not provide adequate room for the mechanism of a conventional sliding door. Additionally, a conventional sliding door does not travel the full extent of its own length during opening, and so the door opening in the vehicle body for ingress and egress may be partially obstructed by a forward portion of the sliding door. Thus, a conventional sliding door mechanism is not able to permit longer sliding door travel without the rear length of the vehicle itself being increased.

SUMMARY

Disclosed embodiments include automotive vehicles with a dual-guide-rail sliding door and dual-guide-rail sliding door systems for an automotive vehicle.

In a non-limiting embodiment, an illustrative automotive vehicle with a dual-guide-rail sliding door is described. The vehicle includes a body of a vehicle; a sliding door movably connected to the body of the vehicle; a front rail connected to a body of the vehicle; a rear rail connected to a body of the vehicle behind rearward of the front rail; a door rail connected to the sliding door; a front arm assembly connected to the sliding door and movably connected to the front rail; and a rear arm assembly movably connected to the rear rail and movably connected to the door rail. The sliding door is movably connected to the body of the vehicle, and a lateral distance travelled by the sliding door along the body of the vehicle from an open position to a closed position is greater than a length of the rear rail.

In another non-limiting embodiment, another illustrative automotive vehicle with a dual-guide-rail sliding door is described. The vehicle includes a body of the vehicle; a sliding door; a front rail connected to the body of the vehicle; a rear rail connected to a body of the vehicle rearward of the front rail; a door rail connected to the sliding door; a front arm assembly connected to the sliding door and movably connected to the front rail; and a rear arm assembly movably connected to the rear rail and movably connected to the door rail. The sliding door is movably connected to the body of the vehicle, and a length of the sliding door is greater than a rear panel length of the vehicle between a rear edge of a door opening and a rear end of the vehicle, the sliding door being configured to open so as to fully expose the door opening of the vehicle.

In another non-limiting embodiment, an illustrative dual-guide-rail sliding door system for an automotive vehicle is described. The system includes a sliding door; a front rail connectable to a body of the vehicle; a rear rail connectable to a body of the vehicle rearward of the front rail; a door rail connectable to the sliding door; a front arm assembly connectable to the sliding door and movably connectable to the front rail; and a rear arm assembly movably connectable to the rear rail and movably connectable to the door rail, such that the sliding door is movably connectable to the body of the vehicle. The system is configured such that a lateral distance travelled by the sliding door along the body of the vehicle from an open position to a closed position is greater than a length of the rear rail.

In another non-limiting embodiment, another illustrative dual-guide-rail sliding door system for an automotive vehicle is described. The system includes a sliding door; a front rail connectable to a body of the vehicle; a rear rail connectable to a body of the vehicle behind the front rail; a door rail connectable to the sliding door; a front arm assembly connectable to the sliding door and movably connectable to the front rail; and a rear arm assembly movably connectable to the rear rail and movably connectable to the door rail. The system is configured such that a length of the sliding door is greater than a rear panel length of the vehicle between a rear edge of a door opening and a rear end of the vehicle, the sliding door being configured to open so as to fully expose the door opening.

Further features, advantages, and areas of applicability will become apparent from the description provided herein. It should be understood that the description and specific examples are intended for purposes of illustration only and are not intended to limit the scope of the present disclosure.

BRIEF DESCRIPTION OF FIGURES

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings.

Like reference symbols in the various drawings generally indicate like elements.

DETAILED DESCRIPTION

The following description is merely illustrative in nature and is not intended to limit the present disclosure, application, or uses. It will be noted that the first digit of three-digit reference numbers and the first two digits of four-digit reference numbers correspond to the first digit of one-digit figure numbers and the first two digits of two-digit figure numbers, respectively, in which the element first appears.

Figure 1A:
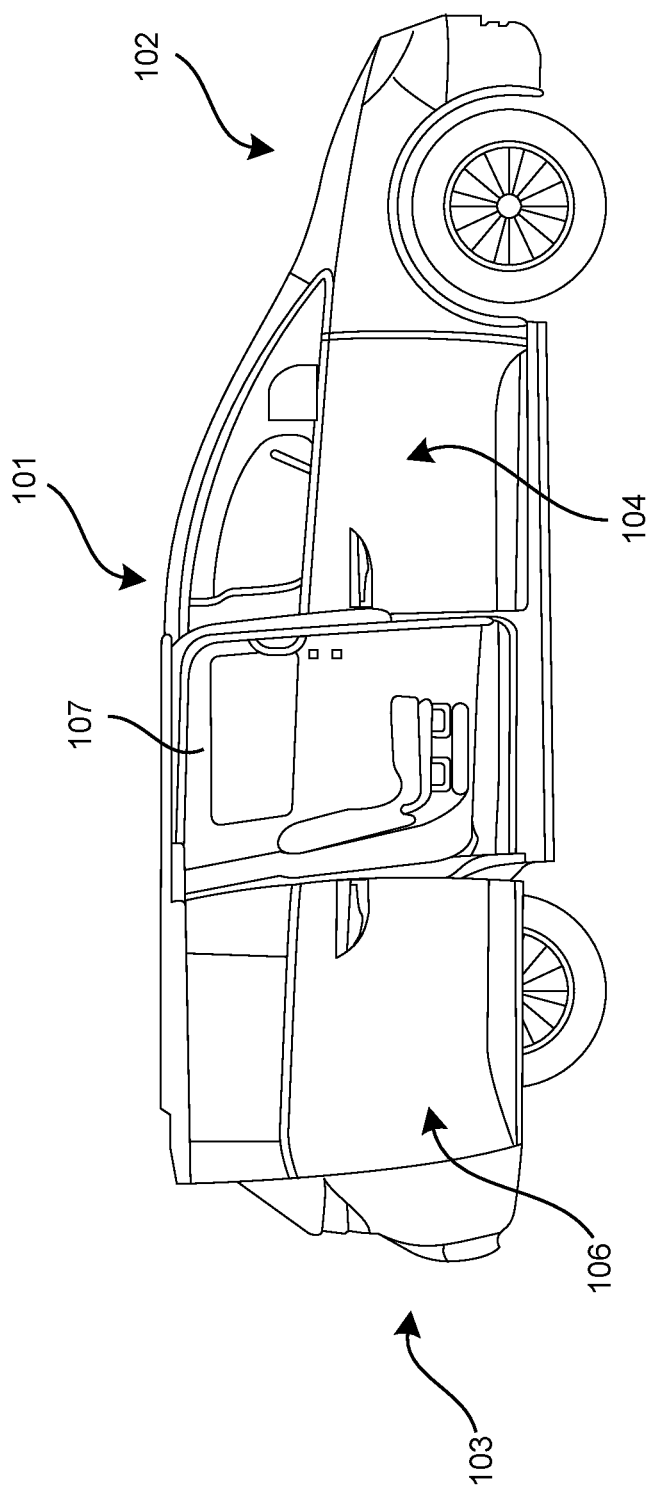
FIG. 1A illustrates an example of a vehicle with an illustrative sliding door in an open position.
Figure 1B:
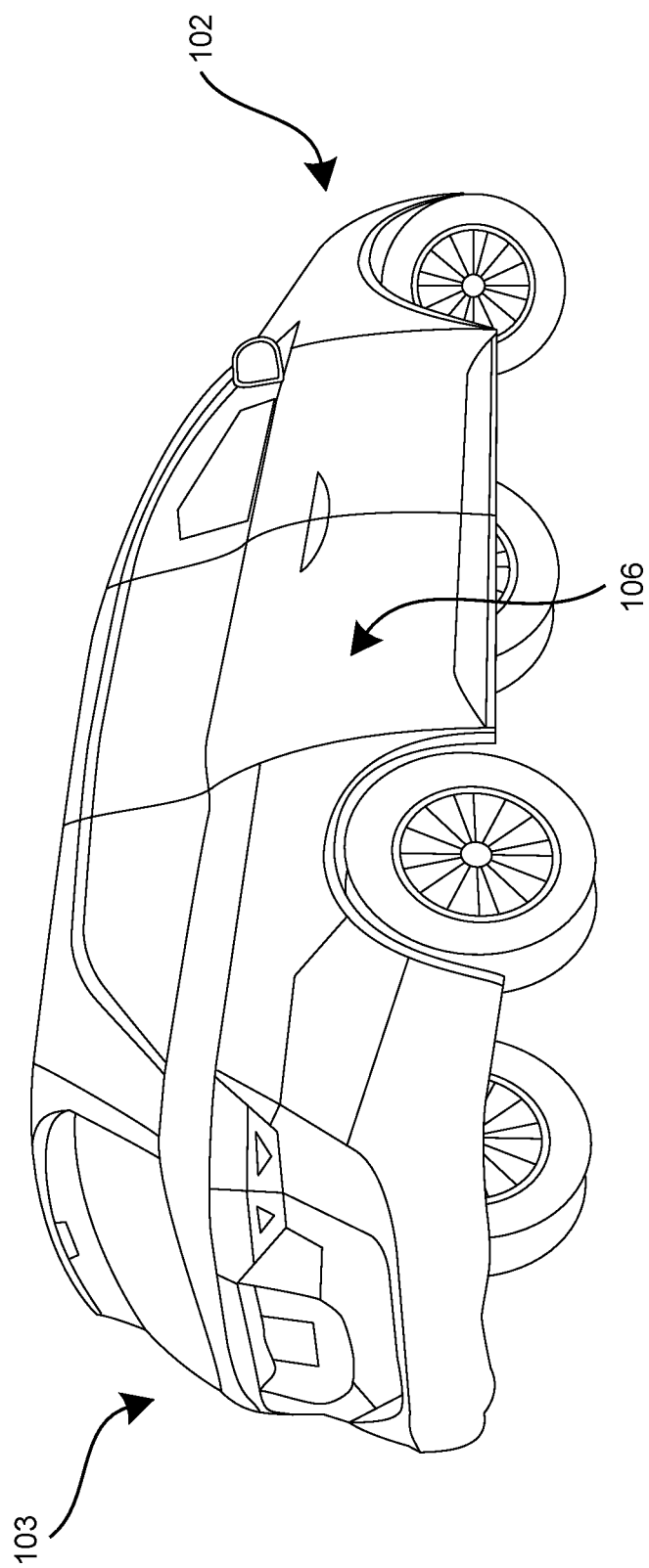
FIG. 1B illustrates an example of a vehicle with an illustrative sliding door in a closed position.

FIGS. 1A and 1B illustrate an illustrative automotive vehicle 101 with a sliding door 106 according to the disclosure. Sliding door 106 moves toward a rear of the vehicle 103 to open as shown on FIG. 1A and moves toward a front of the vehicle 102 to close, as shown on FIG. 1B. The illustrative sliding door 106 is located on a side of the vehicle 104. A vehicle 101 may have a sliding door 106 on one side 104, or two sliding doors 106, one of each side 104. Each vehicle side 104 may have one sliding door 106 or two sliding doors 106. A feature of the illustrative sliding door 106 is that the illustrative sliding door is configured such that it extends rearward of an entire door opening 107 in the vehicle 101, unlike conventional sliding doors that partially obstruct a door opening of a vehicle.

Figure 2:
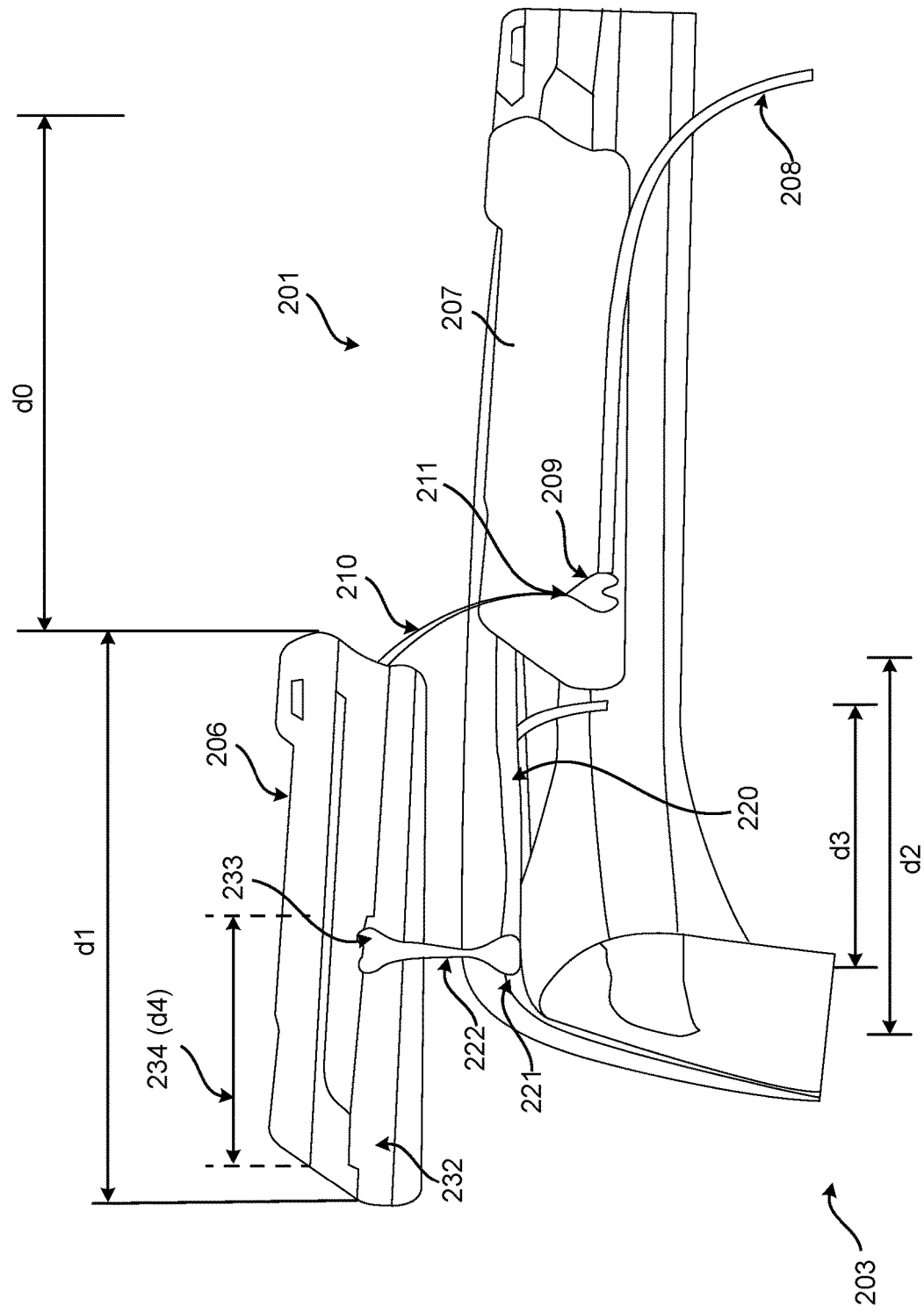
FIG. 2 illustrates an example of a vehicle with an illustrative sliding door in an open position.

FIG. 2 is an illustration of an example of a dual-guide-rail system for a sliding side door 206. In this example, the sliding door 206 is movably connected to a body of an automotive vehicle. The system 201 includes a front rail 208 connected to a body of the vehicle, e.g., via a fixed, rigid connection, and a rear rail 220 connected to the body of the vehicle rearward of the front rail 208, e.g., via a fixed, rigid connection. The front rail 208 may be curved, and the rear rail 220 may be curved, which simply means that each of them may include curved portions and does not require that the entirety of each rail 208, 220 must be curved (e.g., as shown in FIG. 2, forward portions of rails 208 and 220 are curved in this example). A door rail 232 is connected to the sliding door 206, e.g., via a fixed, rigid connection. A front arm assembly may comprise a front arm 210, a front arm pivot connection 211, and a front-rail roller 209 (e.g., one or more rollers). The front arm assembly is connected to the sliding door 206, e.g., with the front arm 210 being connected via a fixed, rigid connection to the door 206. The front arm assembly is movably connected to the front rail 208, e.g., with the front arm 210 being movably connected to front arm pivot connection 211, which is connected to front roller 209, which rides along front rail 208.

A rear arm assembly may comprise a door-rail roller 233, a rear-rail roller 221, and a rear arm 222 rotatably connected to the door-rail roller 233 and rotatably connected to the rear-rail roller 221. The rear arm assembly is movably connected to the rear rail 220 and movably connected to the door rail 232. As such, the sliding door 206 is movably connected to the body of the vehicle. In addition, a lateral distance travelled by the sliding door along the body of the vehicle from an open position to a closed position (labeled d0 in FIG. 2) may be greater than a length of the rear rail 220 (labeled d3 in FIG. 2) in a longitudinal direction (lengthwise direction between the front and rear of the vehicle 201). In addition, as shown in the example of FIG. 2, a length of the door (labeled d1 in FIG. 2) in the longitudinal direction may be greater than a rear panel length (labeled d2 in FIG. 2) of the vehicle 201 between a rear edge of a door opening 207 and a rear end of the vehicle 201, such that sliding door 206 is configured to open so as to fully expose the door opening 207. The rear end of the vehicle 201 in this regard may be determined, e.g., as an end of the rear side panel of the vehicle 201, e.g., a mid-point of a curve between the rear side panel of the vehicle 201 and a rear end panel (right-to-left extending panel) of the vehicle 201.

In this example, it will be appreciated that rails 232, 208 and 220 guide the motion of the door 206. The front rail 208 may be positioned below the floor at the bottom of the door opening 207 and may be concealed by the door 206 when it is in the closed position. The rear rail 220 may be positioned behind the door opening 207 below the beltline of the vehicle and may be exposed on the exterior. Front rollers 209 and rear rollers 221 may follow the paths of rails 208 and 220, respectively, and structural arms 210 and 222 may tie the door to the rollers. The front arm 210 may have a front arm pivot 211 between the front arm 210 and the front roller set 209. In this example, the rear arm 222 may travel down the rear roller rail 220 until it reaches the end at which point the door rail 232 may allow additional door travel 234 via an additional door roller 233 that may be implemented between the rear arm 222 and door rail 232. Door travel 234 is also designated as dimension d4, the approximate length of the door rail 232 inside the door, which alloys for additional travel that d3 alone does not provide. As shown in FIG. 2, an entryway (door opening 207) to the vehicle may be completely unobstructed by the door 206 when the door 206 is in a fully open position. In this fully open position, a rear portion of the door 206 may extend rearward of the vehicle 201, i.e., may extend beyond a rear end of the vehicle 201. In other words, the mechanism shown in FIG. 2 allows for the length of the door 206 (designated as a dimension $d_1$) to be longer than a linear distance from the back of the door opening 207 to an end of the rear side panel of the vehicle 203 (designated as dimension d2), e.g., to a mid-point of a curve between the rear side panel of the vehicle 201 and a rear end panel (right-to-left extending panel) of the vehicle 201. It will be appreciated that this dual guide rail system 201 can overcome space restrictions of a conventional sliding door mechanism by implementing an additional roller rail 232 on the inside of the door 206 which may provide additional roller rail length to supplement the rear roller rail 220. Dimensions for the components illustrated in FIG. 2 may be selected by a person of skill in the art depending on the design and application at hand and are not intended to be limiting. It should be noted that the drawings herein, including FIG. 2, are not necessarily drawn to scale, and illustrative dimensions illustrated in FIG. 2 may include, for example, d0 approximately 1200 mm, d1 approximately 1200 mm, d2 approximately 900 mm, d3 approximately 840 mm, and d4 approximately 700.

Figure 3:
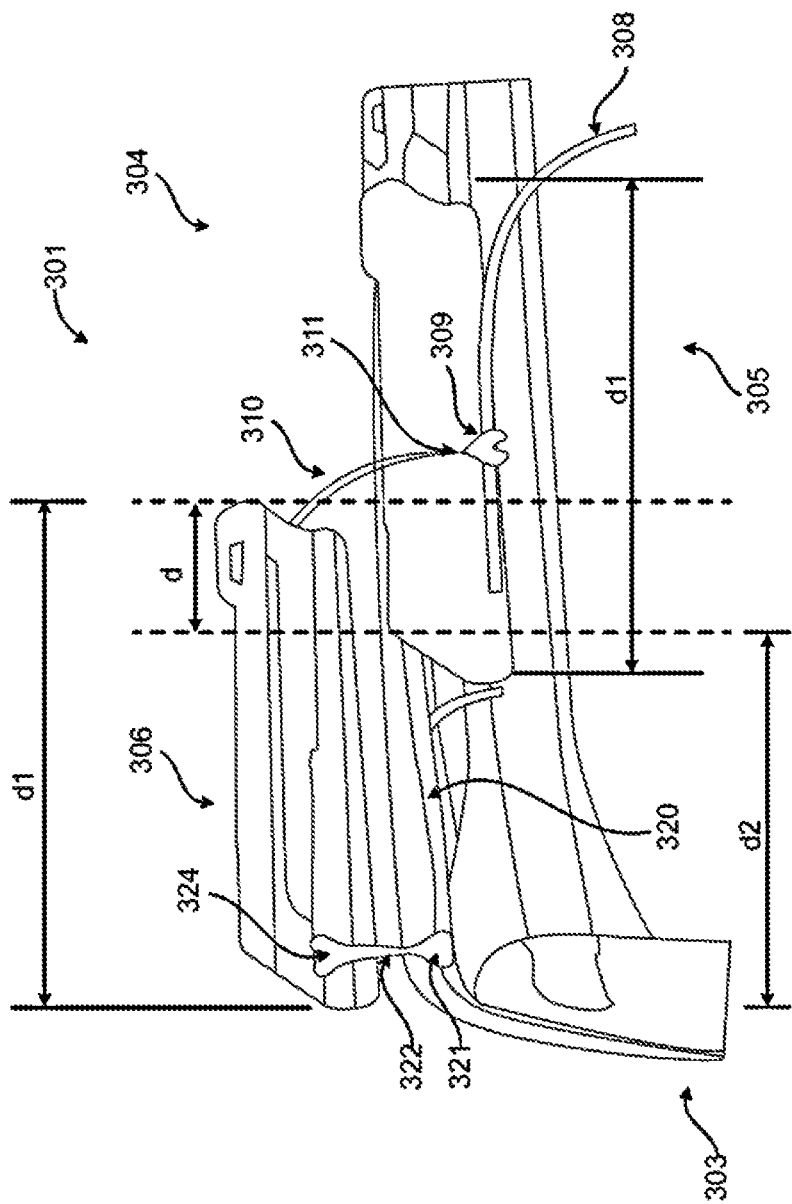
FIG. 3 illustrates an example of a conventional hypothetical vehicle with a sliding door in an open position.

Dual-guide-rail sliding door system as described herein may have advantages over conventional sliding door systems, especially where a rear panel length of the vehicle is shorter than the sliding door length. FIG. 3 illustrates a hypothetical vehicle 301 with a sliding door 306 on a vehicle side 304. FIG. 3 shows a sliding door 306 in an open position, where sliding door 306 moved away from vehicle body 305 and toward a vehicle rear 303. A conventional sliding door mechanism consists of two sliding rails 308 and 320 that are responsible for controlling motion of the door. These rails are typically fixed to the body 305 of the vehicle 301 and are positioned apart vertically and longitudinally to increase stability and strength of the system. The front rail 308 in this system is positioned below the floor at the bottom of the door opening and is concealed by the door 306 when it is in the closed position. The rear rail 320 is found behind the door opening right below the beltline of the vehicle and is exposed on the exterior. Front rollers 309 and rear rollers 321 are used to follow the path of each rail and structural arms 310 and 322 tie the door to the rollers. The rear arm 322 has an integrated door side pivot 324 where it attaches to the door 306 while the front arm 310 has a front arm pivot 311 between the front arm 310 and the front roller set 309. The integrated pivots 311 and 324 allow the front rollers 309 and rear rollers 321 to follow the curvature of the front and rear roller rails, respectively, which controls both the lateral and longitudinal motion of the door.

As shown on FIG. 3, a conventional sliding door mechanism requires a specific packaging environment for the roller rails 308 and 320, which means that the design is not suitable for all vehicle designs. More specifically, in order for the door 306 to travel far enough toward vehicle rear 303 to clear the entire door opening, the rear roller rail 320 must be approximately the same length as the door itself. This requires a significant amount of body length rearward of the door for the rear roller rail 320 to attach to. If the vehicle body 305 does not provide ample length rearward of the door (designated as a dimension $d_2$) to accommodate the full length of the door 306 (designated as a dimension $d_1$), then door travel may be limited to an undesirable amount causing door obstruction of the amount d (as illustrated in FIG. 3) to the occupant's ingress and egress. Illustrative dimensions for d0, d1, d2, d3, d4 are given as follows by way of illustration only and not of limitation. In various embodiments, d0 may be around 1200 mm or so. It will be appreciated that in various embodiments d0 desirably may be as close as possible to d1 in order to utilize as fully as desirable the door opening and to reduce interfere with ingress/egress. It will be appreciated that in various embodiments d1–d0 represents how much the door may block the door opening when the door is in the open position. It will be appreciated that, given by way of illustration only and not of limitation, in various embodiments d1~1200 mm, d2~900 mm, d3~840 mm (and it will be appreciated that because d3 may, in some embodiments, be substantially less than d1, such dimensions may entail implementation of the secondary roller rail inside of the door), and d4~700 mm (which is the length of the secondary roller rail inside of the door and may help allow for additional travel that d3 alone may not allow).

Figure 4:
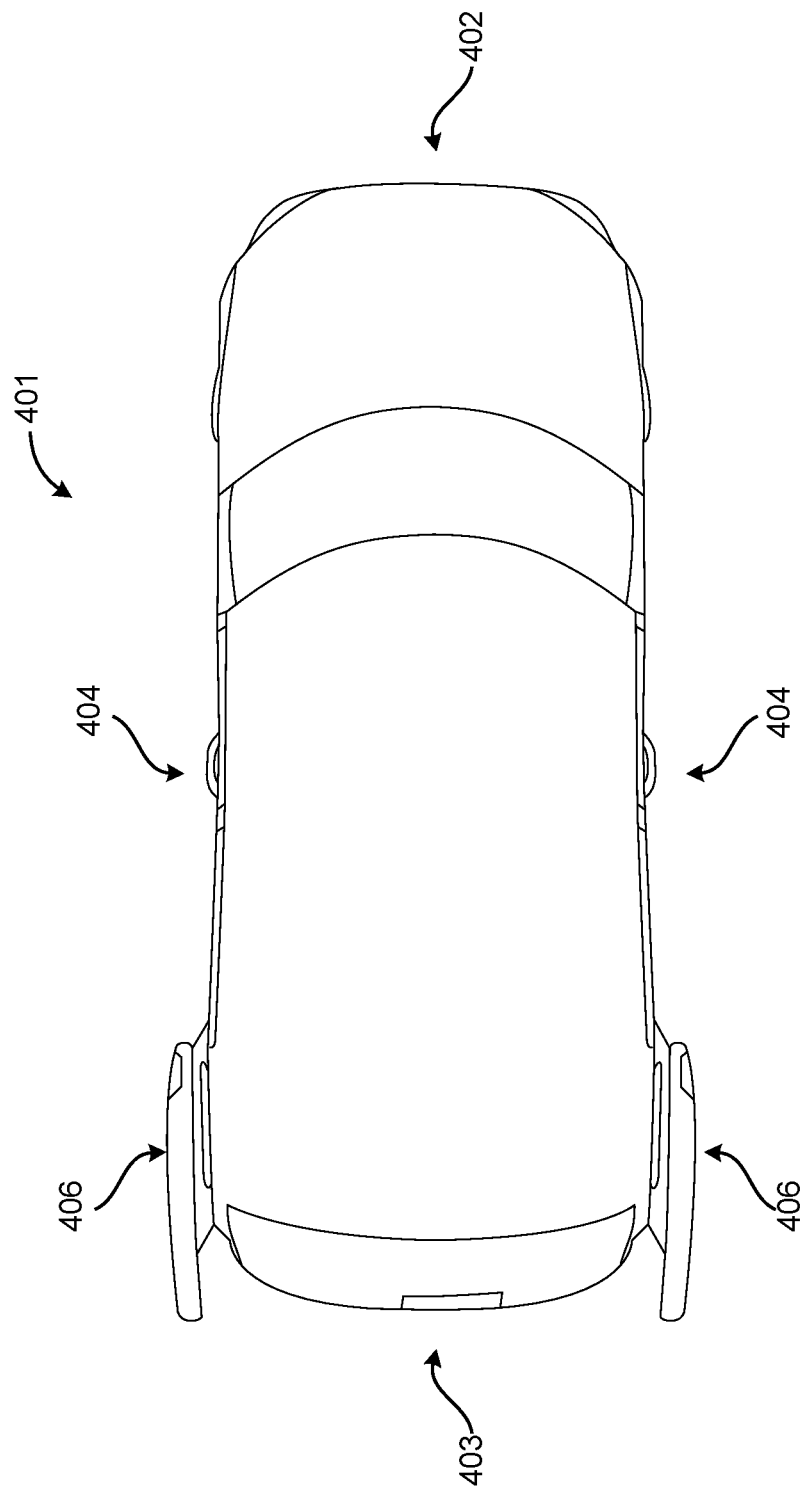
FIG. 4 illustrates an example of a vehicle with two sliding doors in open positions.

FIG. 4 is an illustration of an example where a vehicle 401 has two sides 404, a front 402, and a rear 403 and two sliding doors 406 according to an example. Both sliding doors 406 are equipped with door rails and mechanisms (not shown) such as described with regard to FIG. 2, which allow each of the doors 406 to fully open such that they do not obstruct the door openings in a fully open position, while both doors 406 extend rearward beyond a rear 403 of the vehicle 401.

Figure 5:
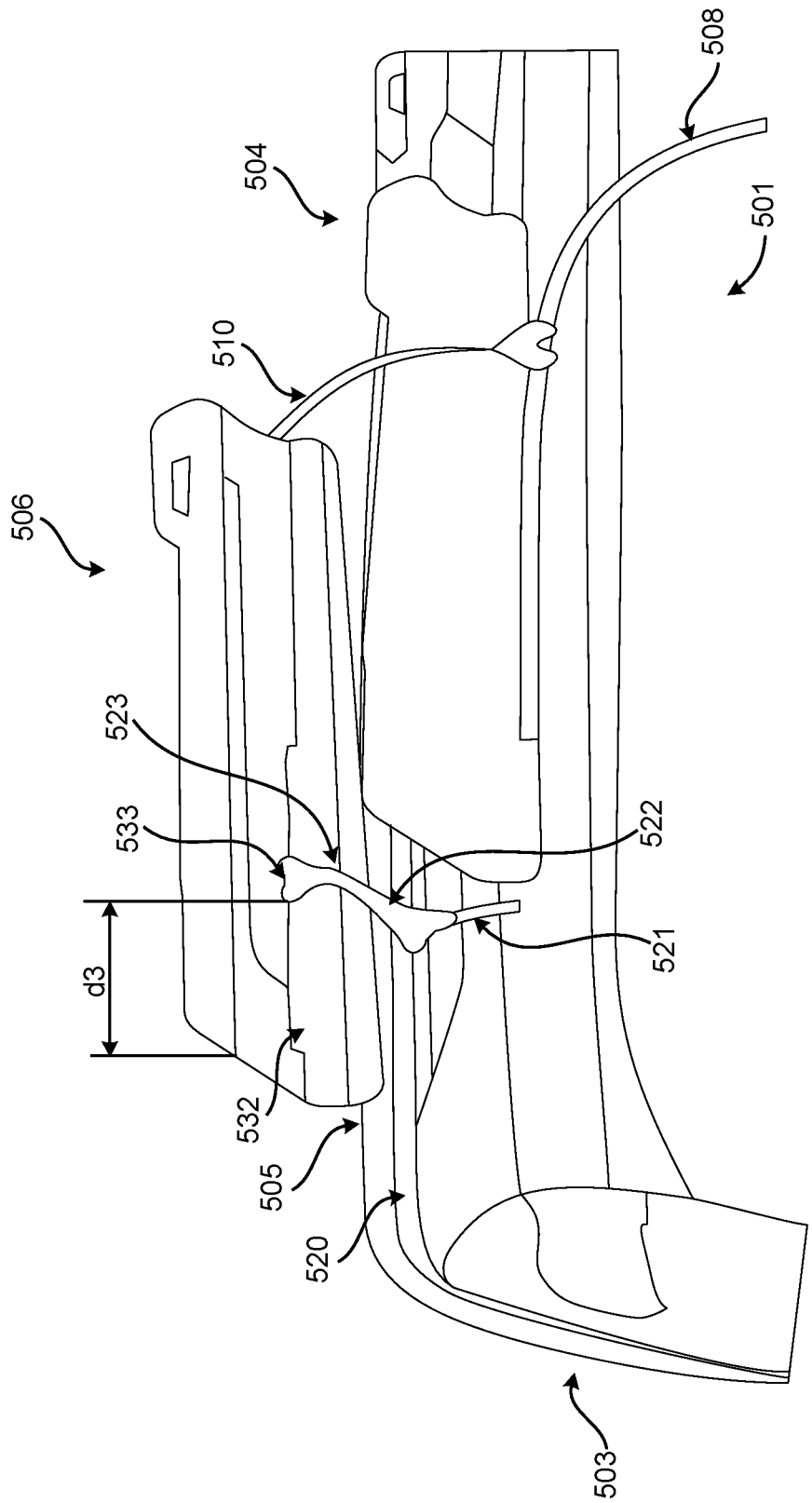
FIG. 5 illustrates an example of an illustrative sliding door with a door side pivot.
Figure 6:
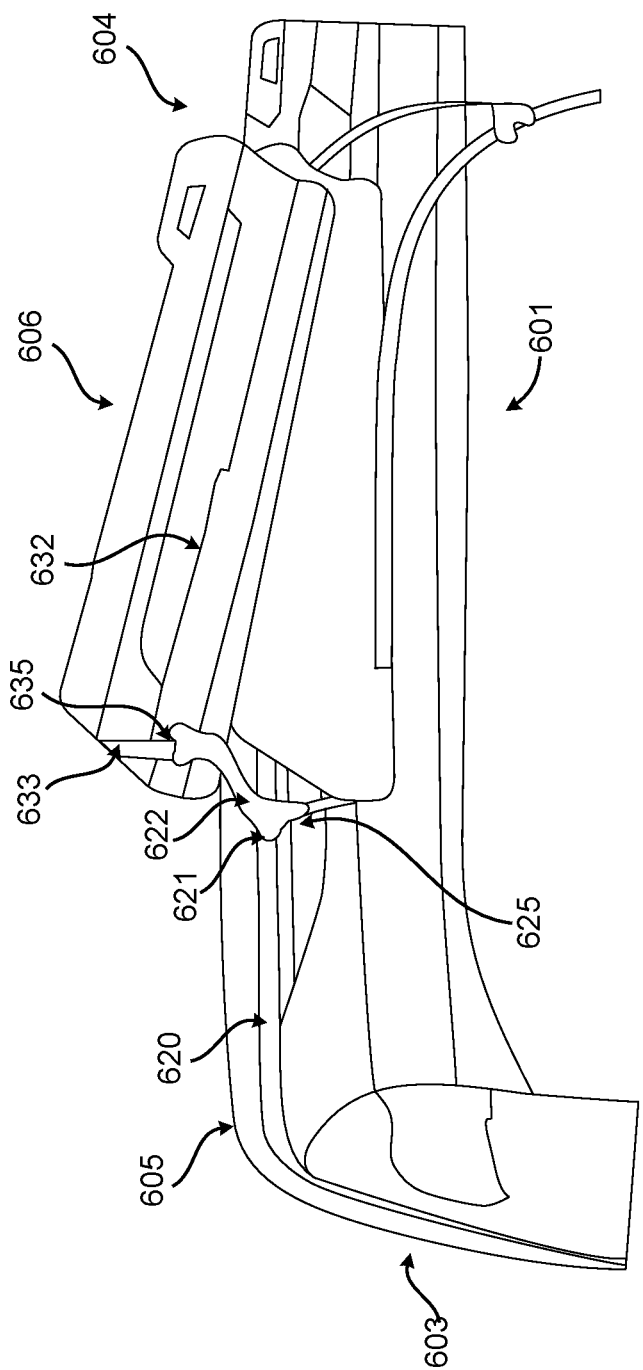
FIG. 6 illustrates an example of an illustrative sliding door with a curved door rail.

FIG. 5 is an illustration of a design consideration for dual-guide-rail design on a vehicle 501, which may have a rear 503 and a side 504 according to the disclosure. Utilization of merely a door roller 533 and a pivot 523 between the rear arm 522 and the door 506, together with rear roller 521 between the rear arm 522 and the rear rail 520 may result in a collision between the door 506 and the body 505 of the vehicle 501. This collision may occur when the rear arm 522 has not reached the end of its travel on the door rail 532 (e.g., it still has distance d3 to travel) before it begins to pivot inboards, while the front arm 510 is still travelling along the front rail 508. While the position of the rear arm 522 or the pivoting action may be precisely controlled, this may require a complex mechanism. FIG. 6 illustrates an illustrative mechanism for avoiding such collision.

FIG. 6 illustrates a solution to the issue of possible collisions between sliding door 606 and body 605 of vehicle 601 along a side 604. This solution avoids the potential door swing interference with the body of the vehicle while maintaining the benefits of the supplementary door rail 632. A solution may involve a curved door roller rail 632 and a rigid rear arm 622. In this example, a rigid (non-pivoting) rear arm 622 may be constrained by the curvature of both the rear roller rail 620 and door roller rail 632. When the door 606 is traveling away from the vehicle rear 603 and the rear arm 622 reaches the curvature 625 of the rear rail 620, it may not pivot the door inboard until the rollers 633 on the door-side of the arm 622 also reach the curvature 635 of the door rail 632. If the rear arm 622 is located on the straight portion of either rear rail 620 or door rail 632, then it may be constrained to only travel in the linear direction due to the dual rollers 621 and 633 on each end of the rear arm.

Figure 7:
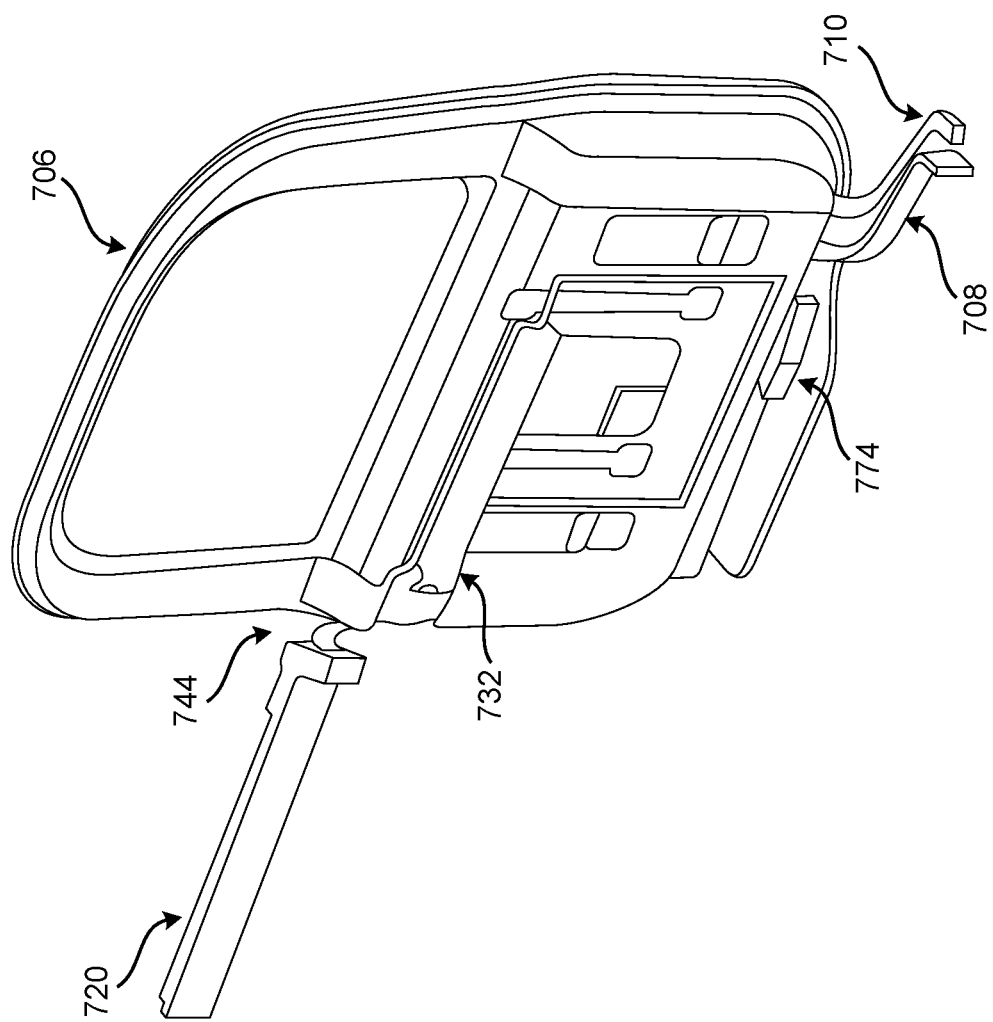
FIG. 7 illustrates an example of an illustrative sliding door.
Figure 8:
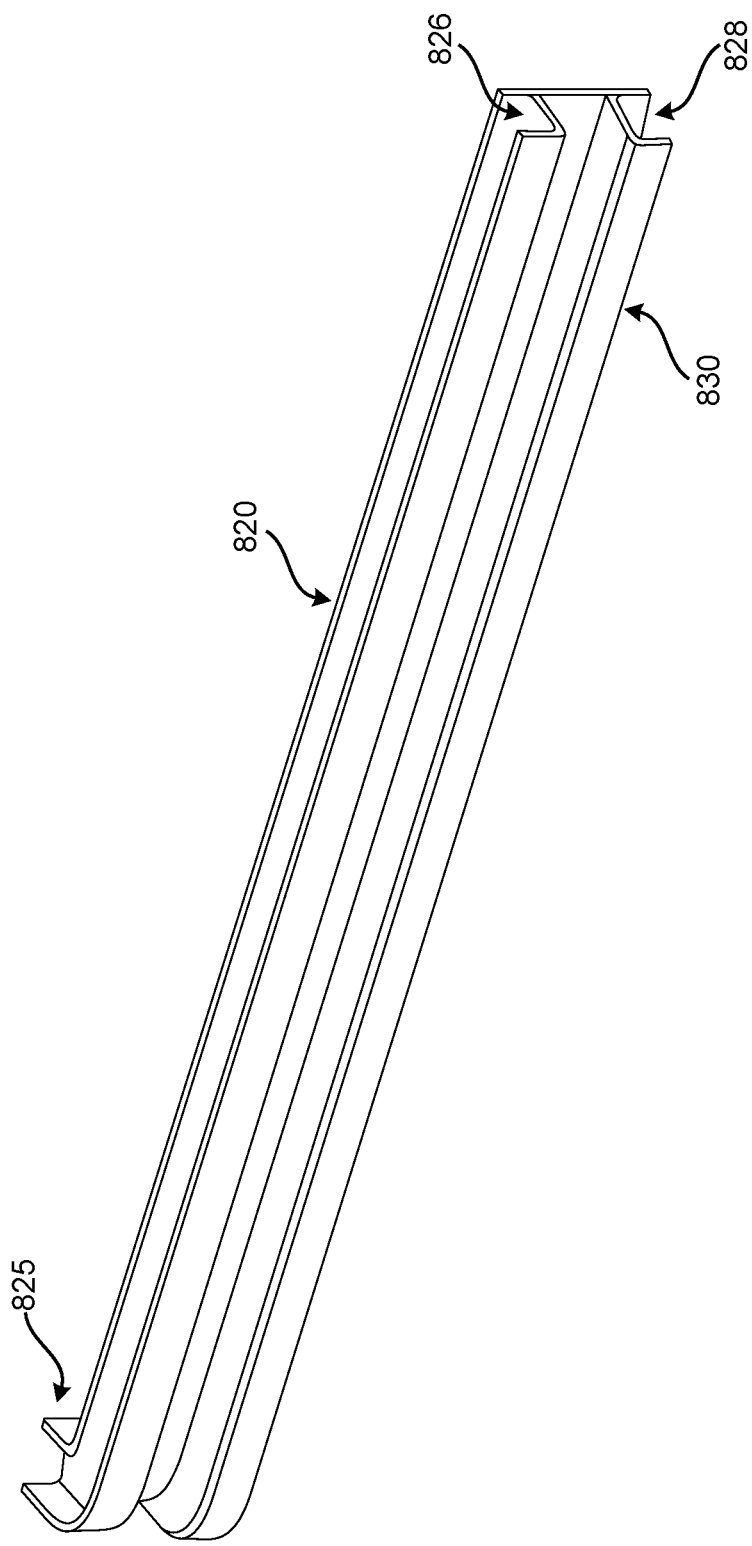
FIG. 8 illustrates an example of a rear rail for an illustrative sliding door.

Additional details regarding components of illustrative dual-guide-rail sliding door mechanisms will now be described with reference to FIGS. 7-27B. FIG. 7 illustrates major components of a sliding door 706 with dual rail guide according to an example. Major components may include front rail 708, front arm 710, rear rail 720, rear arm assembly 744, door rail 732, and electric drive assembly 774. FIG. 8 illustrates an example of a rear roller rail 820, also referred to as a rear rail, according to an example. The function of the rear roller rail 820 may be to guide the rollers of the rear arm assembly to control rear positioning of the door (not shown) in conjunction with door roller rail (not shown). The rear roller rail 820 may also be responsible for supporting a portion of the door weight. The rear roller rail 820 may be to rigidly attach to vehicle body, rear of the door opening and slightly below the beltline. The rear roller rail 820 may have a curvature 825 on one end. The specific geometry of curvature 825 may be vehicle dependent. The rear roller rail 820 may have a rear rail top channel 826. The rear roller rail 820 may have a rear rail bottom channel 828. The rear roller rail 820 may have a rear rail middle channel 830.

Figure 9:
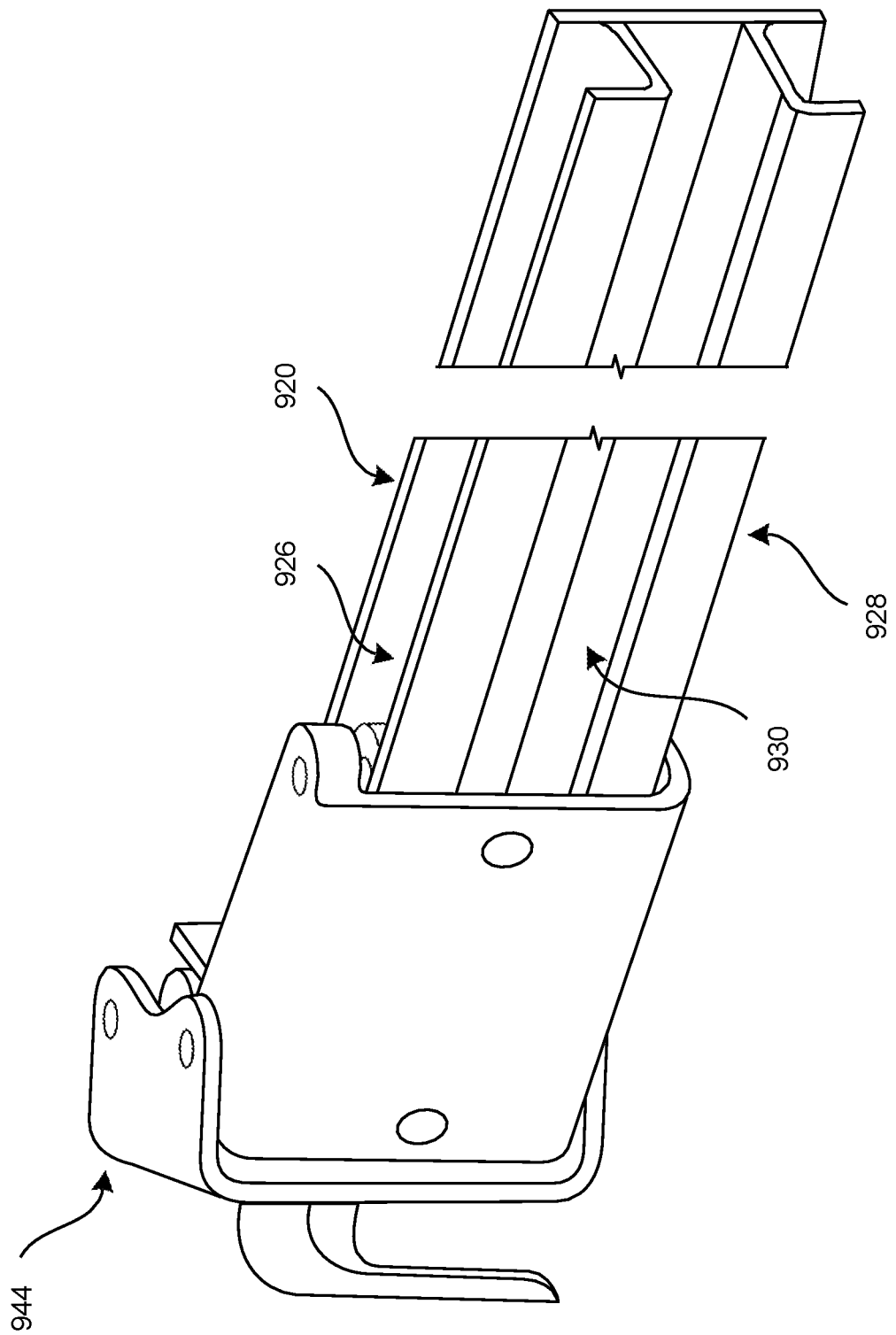
FIG. 9 illustrates an example of a curved portion of a rear rail for an illustrative sliding door.

FIG. 9 illustrates additional features of a rear rail 920 in an example. The top channel 926 of the rear rail and the bottom channel 928 of the rear rail may control lateral and fore-aft motion of the rear arm assembly 944 relative to the vehicle body. Top and bottom channels may also react lateral loads. The middle channel 930 may support rear weight of the door.

Figure 10:
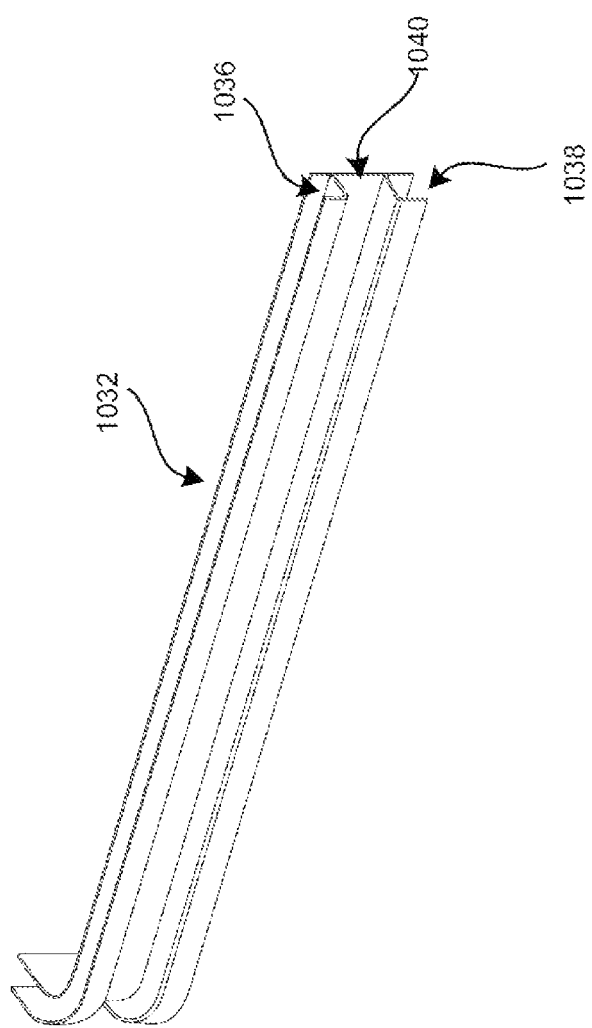
FIG. 10 illustrates an example of a door rail for an illustrative sliding door.

FIG. 10 is an illustration of a door roller rail (also referred to as a door rail) 1032 according to an example. The function of the door rail 1032 may be to guide the rollers of the rear arm assembly to control rear positioning of the door (in conjunction with rear roller rail). The door rail 1032 may also be responsible for supporting a portion of the door weight. The door rail 1032 may be rigidly attached to vehicle door structure on the inboard side slightly below the beltline. The door rail 1032 may have a door rail top channel 1036. The door rail 1032 may have a door rail bottom channel 1038. The door rail 1032 may have a door rail middle channel 1040.

Figure 11:
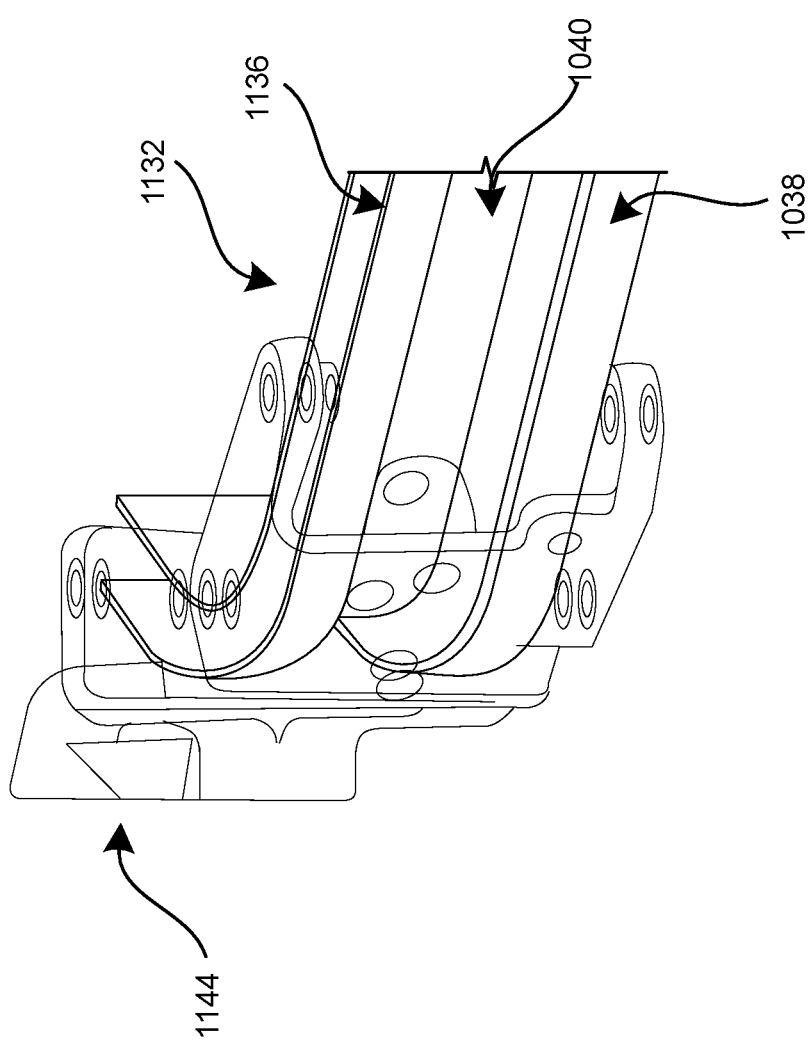
FIG. 11 illustrates an example of a curved portion of a door rail for an illustrative sliding door.

FIG. 11 illustrates additional features of a door rail 1132 in an example. The top channel 1136 of the door rail and the bottom channel 1038 of the door rail may control lateral and fore-aft motion of the door relative to the rear arm assembly 1144. Top and bottom channels 1136 and 1038 may also react lateral loads. The middle channel 1140 may support rear weight of the door.

Figure 12:
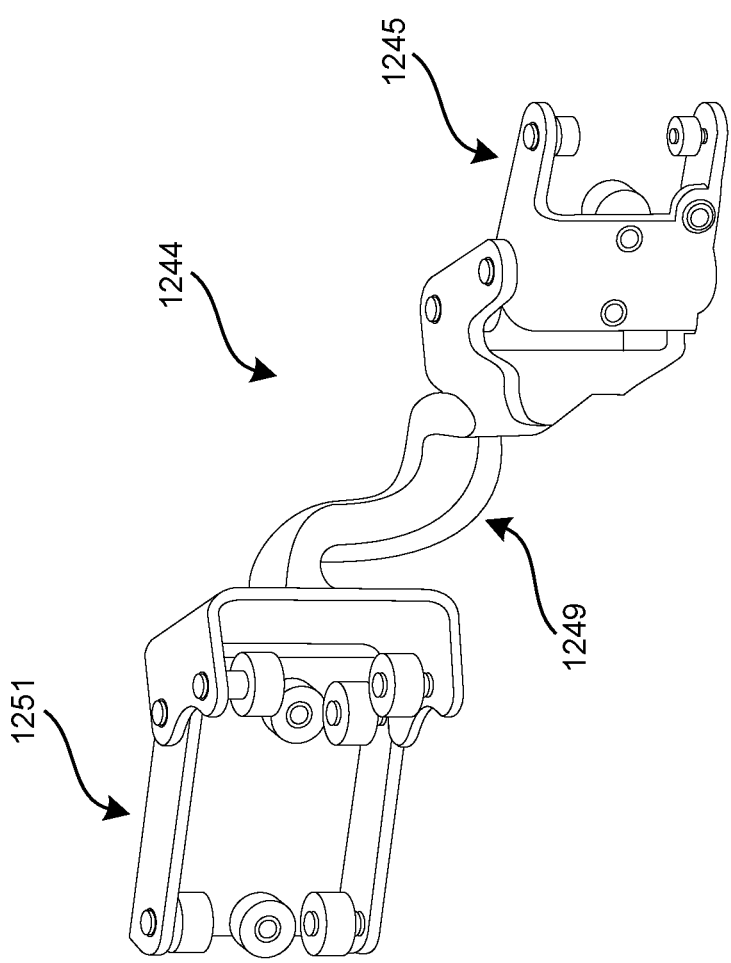
FIG. 12 illustrates an example of a rear arm assembly for an illustrative sliding door.

FIG. 12 is an example of a rear arm assembly 1244 according to an example. The function of the rear arm assembly 1244 may be to form the rearward connection between the door and vehicle body. Another function of the rear arm assembly 1244 may be to support a portion of the door weight in addition to controlling door swing motion. Rollers on one end of the rear arm assembly 1244 may interact with the rear roller rail while the other end interacts with the door rail. The rear arm assembly 1244 may include three sections, which may include door rail roller carrier 1245, rear arm 1249, and rear rail roller carrier 1251. A three-piece design of the rear arm assembly 1244 may split up multiple functions of the rear arm assembly into separate components, each responsible for its own functionality, but which work together.

Figure 13:
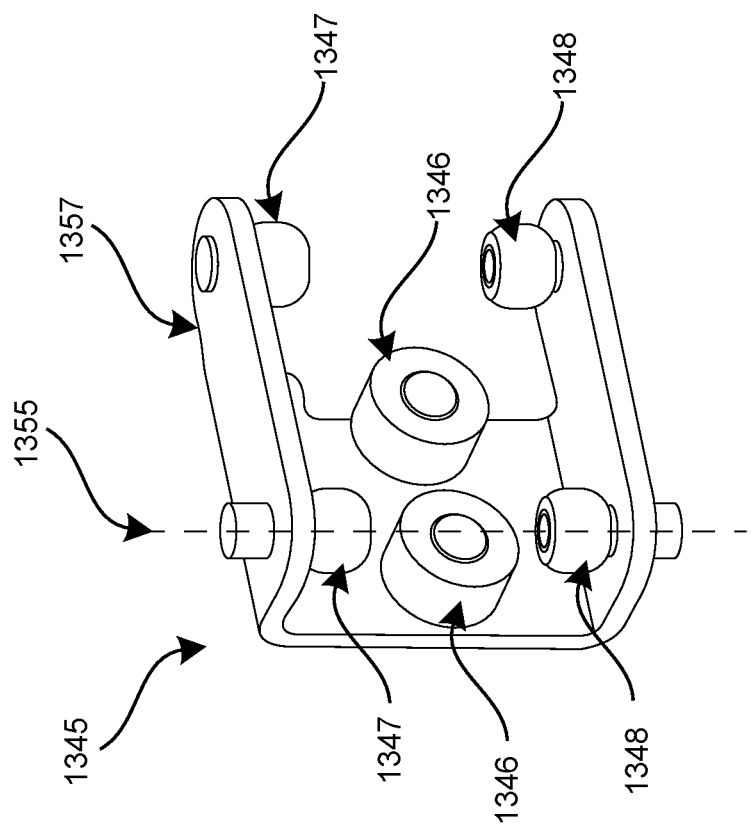
FIG. 13 illustrates an example of a door rail roller carrier for an illustrative sliding door.

FIG. 13 is an illustration of a door rail roller 1345 according to an example. The door rail roller 1345 may have a door-rail-roller carrier bracket 1357. The door rail roller 1345 may have middle rollers 1346. The door rail roller 1345 may have top rollers 1347. The door rail roller carrier 1345 may have bottom rollers 1348. Middle rollers 1346 on the door rail roller 1345 may transfer the primary vertical load from the door to the rear arm. Top rollers 1347 and bottom rollers 1348 on the door rail roller 1345 may react lateral bending moments between the door and the rear arm. The door rail roller 1345 may pivot with respect to rear arm around pivot axis 1355 of the door rail roller.

Figure 14:
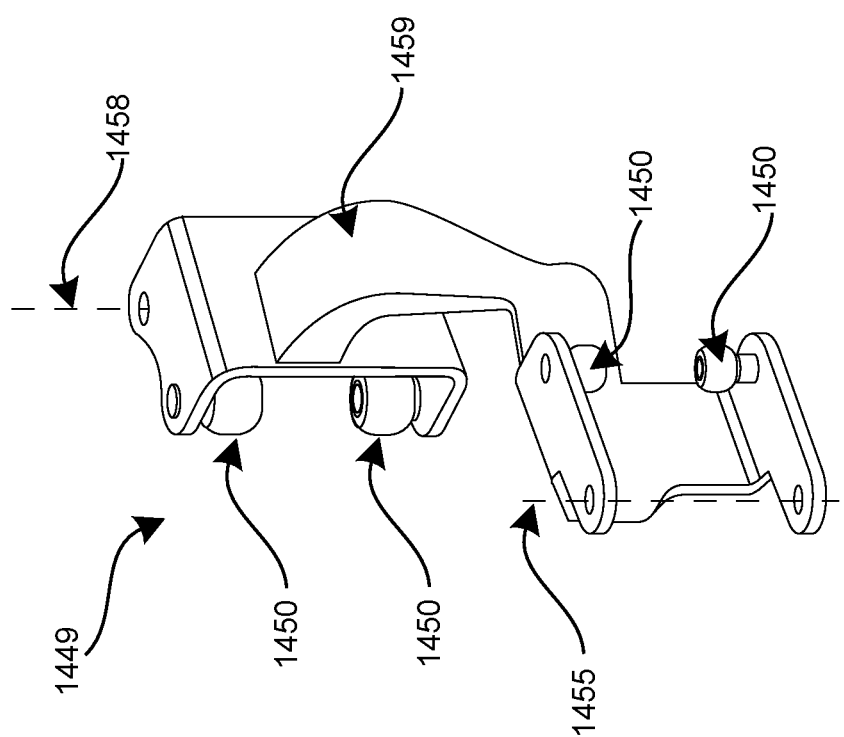
FIG. 14 illustrates an example of a rear arm for an illustrative sliding door.

FIG. 14 is an illustration of an illustrative rear arm 1449 according to an example that may be used for rear arm 1249 shown in FIG. 12. Rear arm 1449 may have a rear arm bracket 1459. Rear arm 1449 may have rear arm rollers 1450. Rollers 1450 on the rear arm 1449 may control motion of the door by following the curvature of the rails while the roller carriers remain on the linear portions. Rear arm 1449 may pivot with respect to door rail roller carrier around pivot axis 1455. Rear arm 1449 may pivot with respect to rear rail roller carrier around pivot axis 1458.

Figure 15:
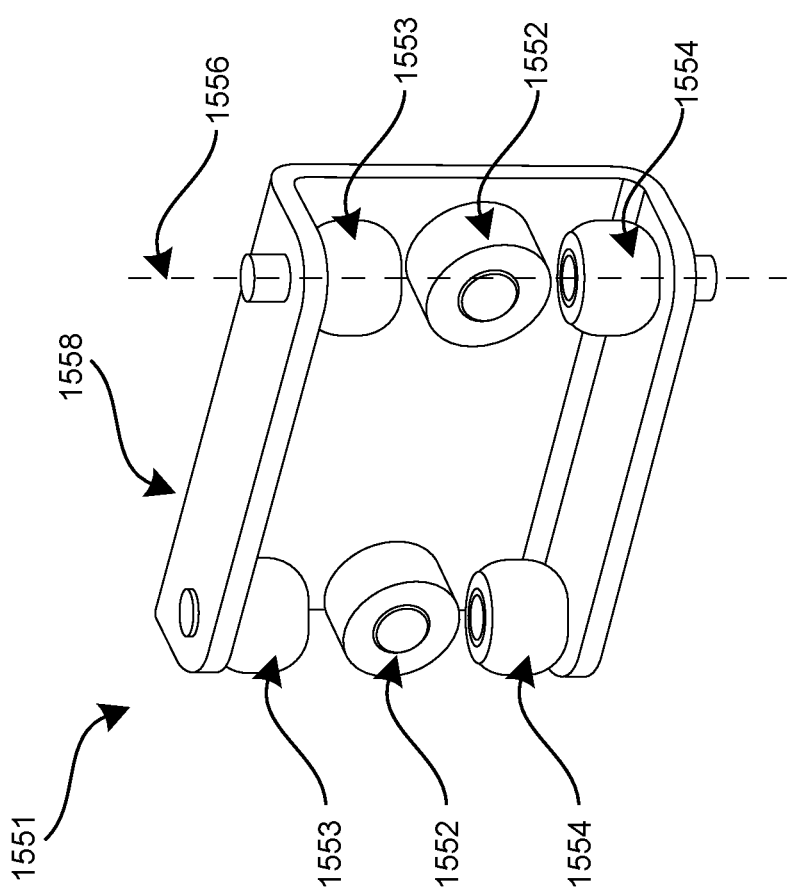
FIG. 15 illustrates an example of a rear rail roller carrier for an illustrative sliding door.

FIG. 15 is an illustration of a rear rail roller 1551 according to an example. Rear rail roller 1551 may have a rear rail roller carrier bracket 1558. Rear rail roller 1551 may have middle rollers 1552. Rear rail roller 1551 may have top rollers 1553. Rear rail roller 1551 may have bottom rollers 1554. Middle rollers 1552 on the rear rail roller carrier 1551 may react the primary vertical load induced by the weight of the door transferred through the rear arm. Top rollers 1553 and bottom rollers 1554 on the rear rail roller 1551 may react lateral bending moments induced by the weight of the door cantilevered through the rear arm. The rear rail roller 1551 may pivot with respect to rear arm around pivot axis 1556 of the rear rail roller.

Figure 16:
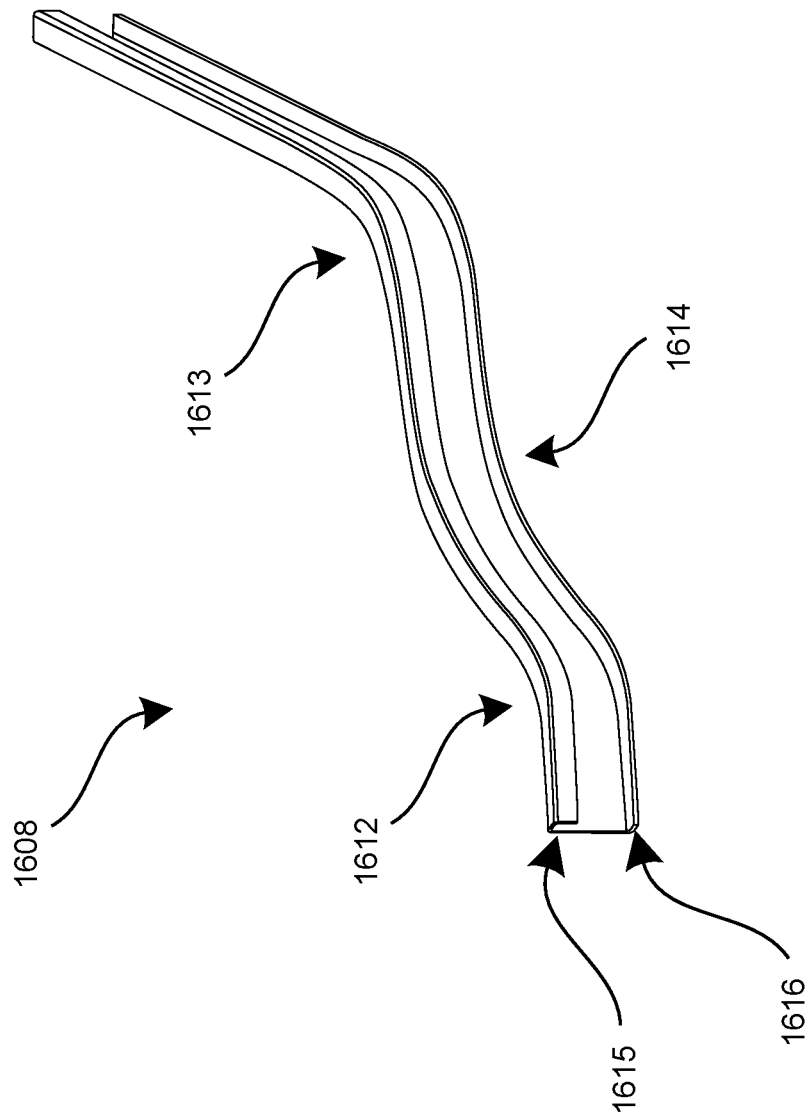
FIG. 16 illustrates an example of a front rail for an illustrative rail sliding door.

FIG. 16 is an illustration of a front roller rail (also referred to as a front rail) 1608 according to an example. The function of the front rail 1608 may be to guide the rollers of the front arm assembly to control forward positioning of the door. The front rail 1608 may also be responsible for supporting a portion of the door weight. The front rail 1608 may be rigidly attached to vehicle body underneath the floor plane and longitudinally aligned with the door opening. Front end of the front rail may curve inboard and forward of the door opening area. The specific curvature of the front rail may be vehicle dependent. Front rail 1608 may include a first bend 1612. Front rail 1608 may include a second bend 1613. First bend 1612 may guide the door in and out of the door latch and may control how the door interacts with the door seals. Second bend 1613 may be responsible for primary lateral travel of the door to clear the vehicle body on the vehicle side. Zone 1614 between first bend 1612 and second bend 1613 may be critical for packaging the structural pillar forward of the door opening. Front rail 1608 may include a top channel 1615, which may control lateral and fore-aft motion of the front arm assembly relative to the vehicle body and which may react lateral loads. Front rail 1608 may include a lower lip 1616, which may support front weight of the door.

Figure 17:
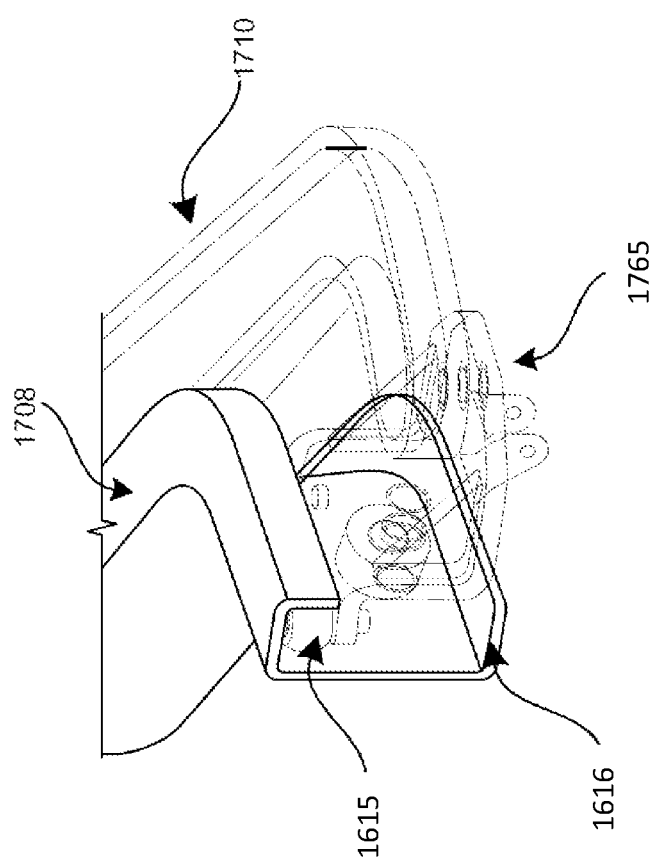
FIG. 17 illustrates an example of a portion of a front rail for an illustrative sliding door.

FIG. 17 illustrates an interaction between a front rail 1708, a front arm 1710, and a front roller carrier 1765 according to an example.

Figure 18:
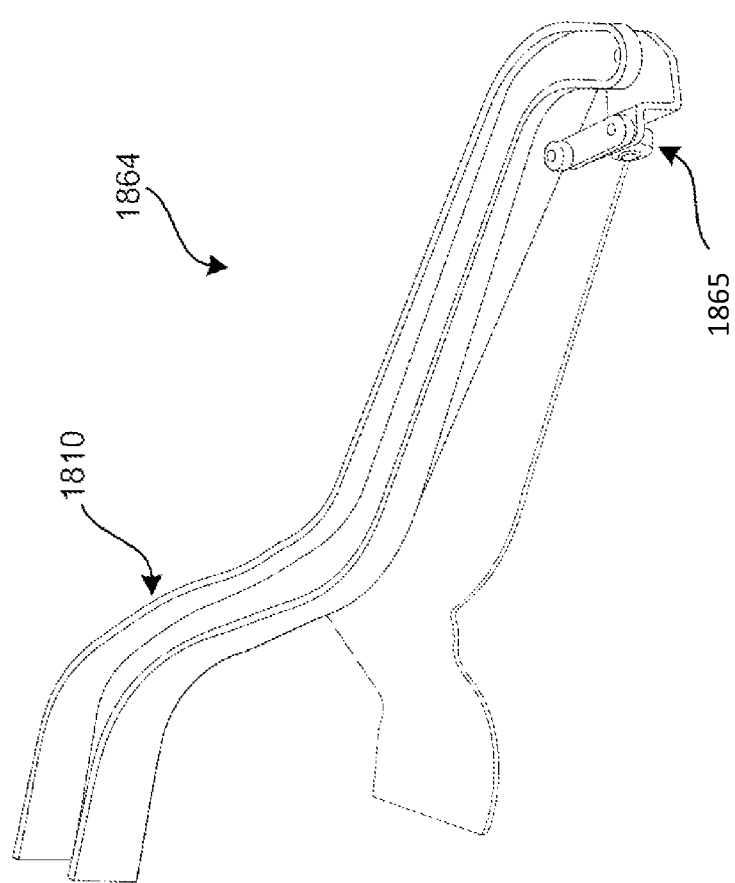
FIG. 18 illustrates an example of a front arm assembly for an illustrative sliding door.

FIG. 18 illustrates a front arm assembly 1864 according to an example. Front arm assembly 1864 may include a front arm 1810 and a front roller carrier 1865. A function of a front arm assembly 1864 may be to form the forward connection between the door and vehicle body. A function of a front arm assembly 1864 may also, or alternatively, be to support a portion of the door weight in addition to controlling door swing motion. Rollers on one end of the arm may interact with the front roller rail while the other end is fixed to the door structure. The curvature of the front arm 1810 and dimensions may be dependent on a vehicle application.

Figure 19:
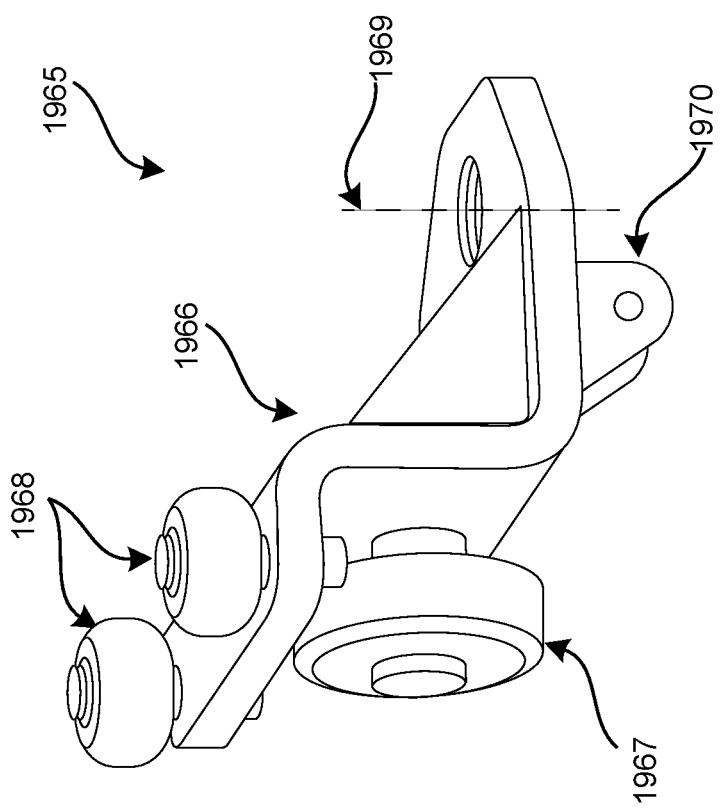
FIG. 19 illustrates an example of a front arm roller carrier for an illustrative sliding door.

FIG. 19 illustrates a front roller 1965 according to an example. Front roller 1965 may include a front roller carrier bracket 1966 with an attachment 1970 for electric drive system, bottom roller 1967, and top rollers 1968. Bottom roller 1967 on the front roller carrier 1965 may react the primary vertical load induced by the weight of the door transferred through the front arm. Top rollers 1968 on the front roller 1965 may react lateral loads transferred through the front arm and control motion of the door by following the curvature of the front roller rail. Front roller 1965 may rotate with respect to front arm around pivot axis 1969 of front roller.

Figure 20:
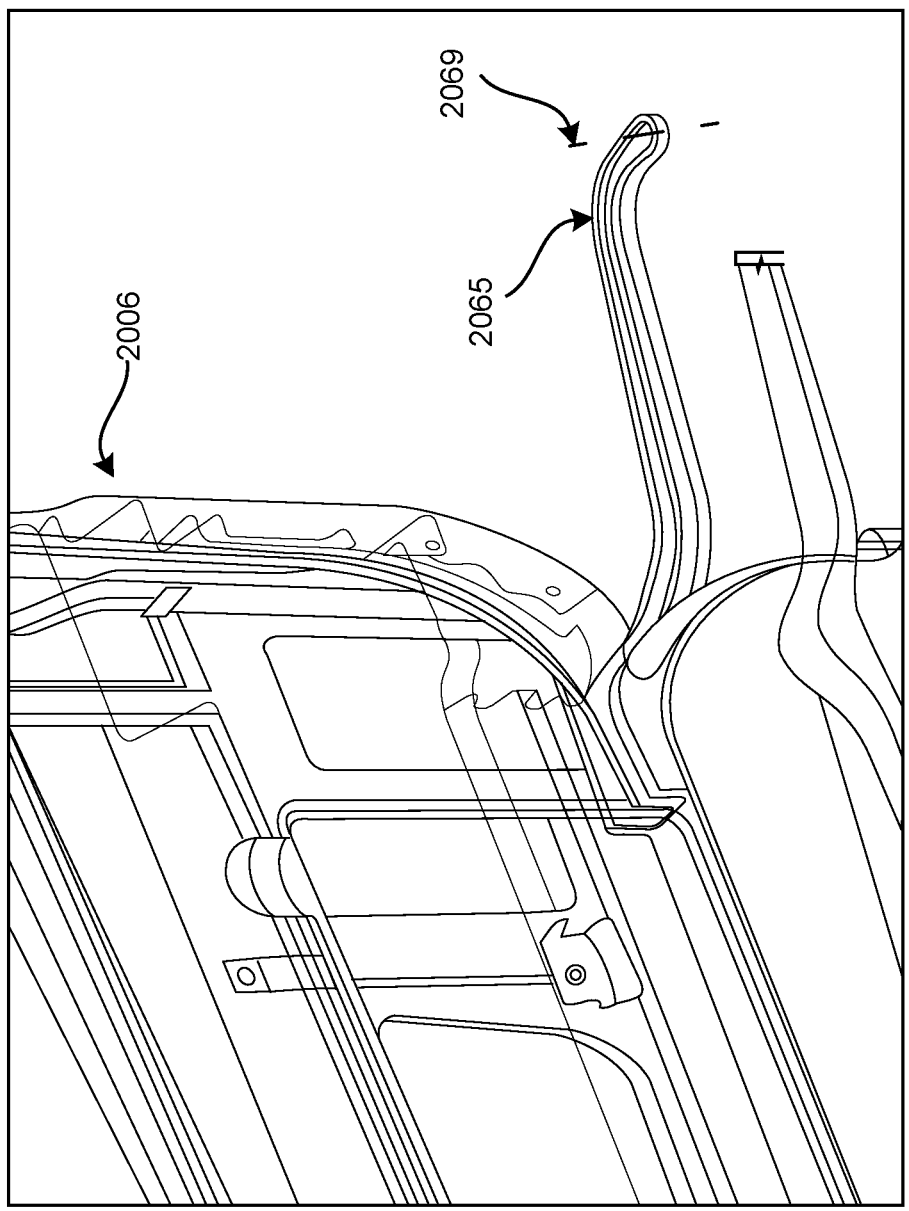
FIG. 20 illustrates an example of a front arm for an illustrative sliding door.

FIG. 20 illustrates a front arm 2065 according to an example. The front arm 2065 may transfer load from the door structure 2006 to the front roller carrier and may be designed to pass under the floor where it may be concealed when the door is closed. The front arm 2065 may rotate with respect to a front roller carrier around a pivot axis 2069 of front roller carrier.

Figure 21A:
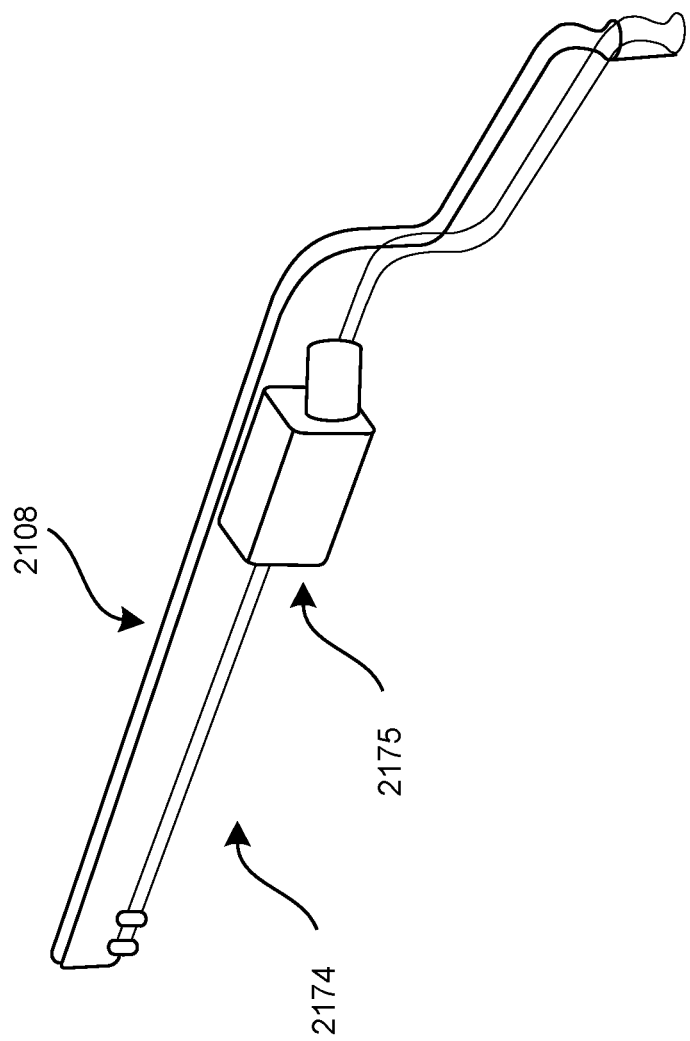
FIG. 21A illustrates a top perspective view of an electric drive assembly for an illustrative sliding door.
Figure 21B:
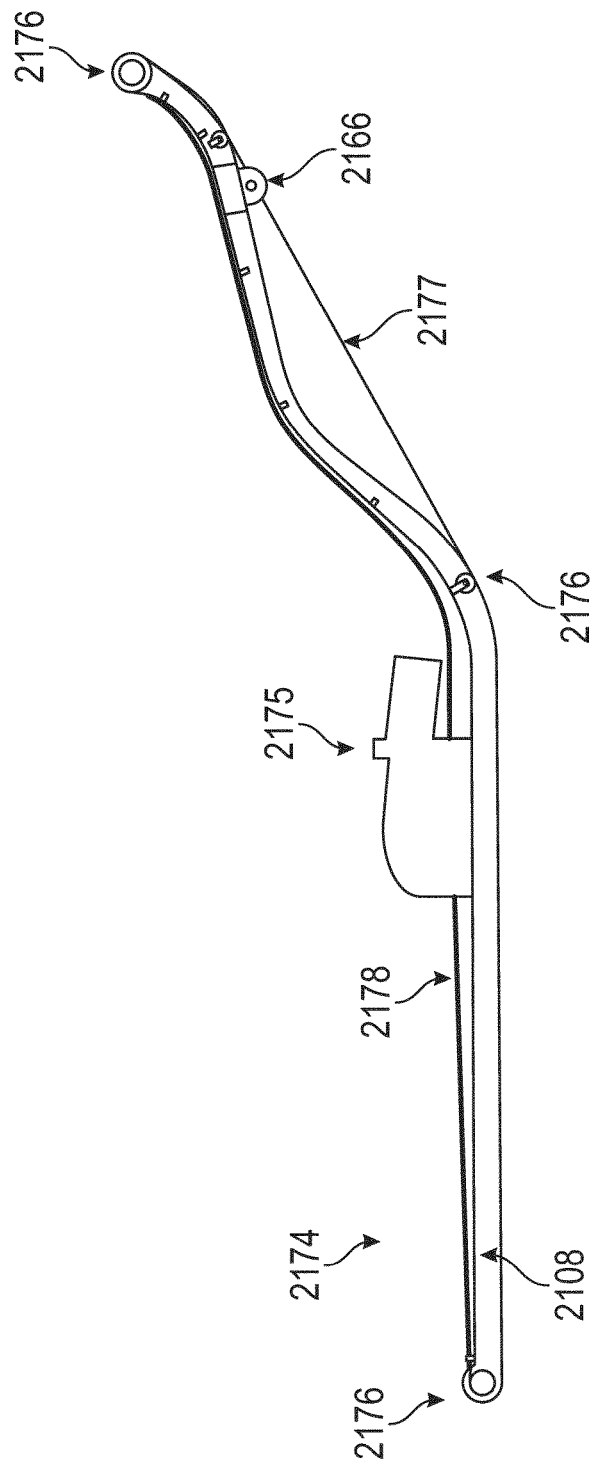
FIG. 21B illustrates a top view of an electric drive assembly for an illustrative sliding door.

FIGS. 21A and 21B illustrate an electric drive assembly 2174 according to an example. Electric drive assembly 2174 may be capable of opening and closing the door by moving the door along the roller rails via a motor driven cable system. Electric drive unit 2175 and wire guides 2178 may be positioned on the front roller rail 2108. Drive cable 2177 may connect to roller carrier of the front arm assembly. The drive wire cable 2177 may form a loop around the front roller rail 2108 routing through an electric drive unit 2175 and a pulley system that may consist of several guide pulleys 2176. Wire 2177 may also be secured to the front roller carrier 2166. The electric drive unit 2175 may be able to pull the wire 2177 in both directions, effectively opening and closing the door by moving the front roller carrier 2166 along the front roller rail 2108.

Figure 22A:
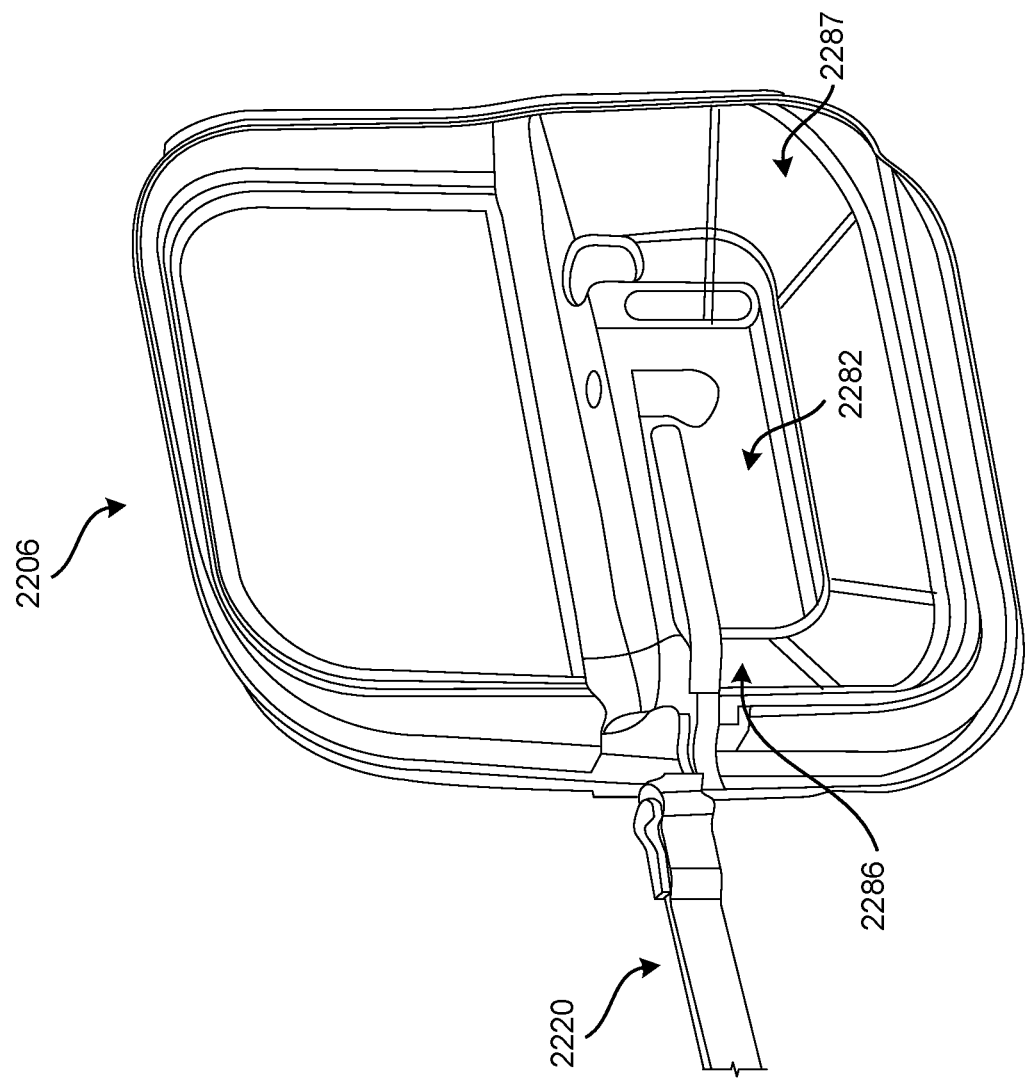
FIG. 22A illustrates an example of rail covers for an illustrative sliding door in a closed position.
Figure 22B:
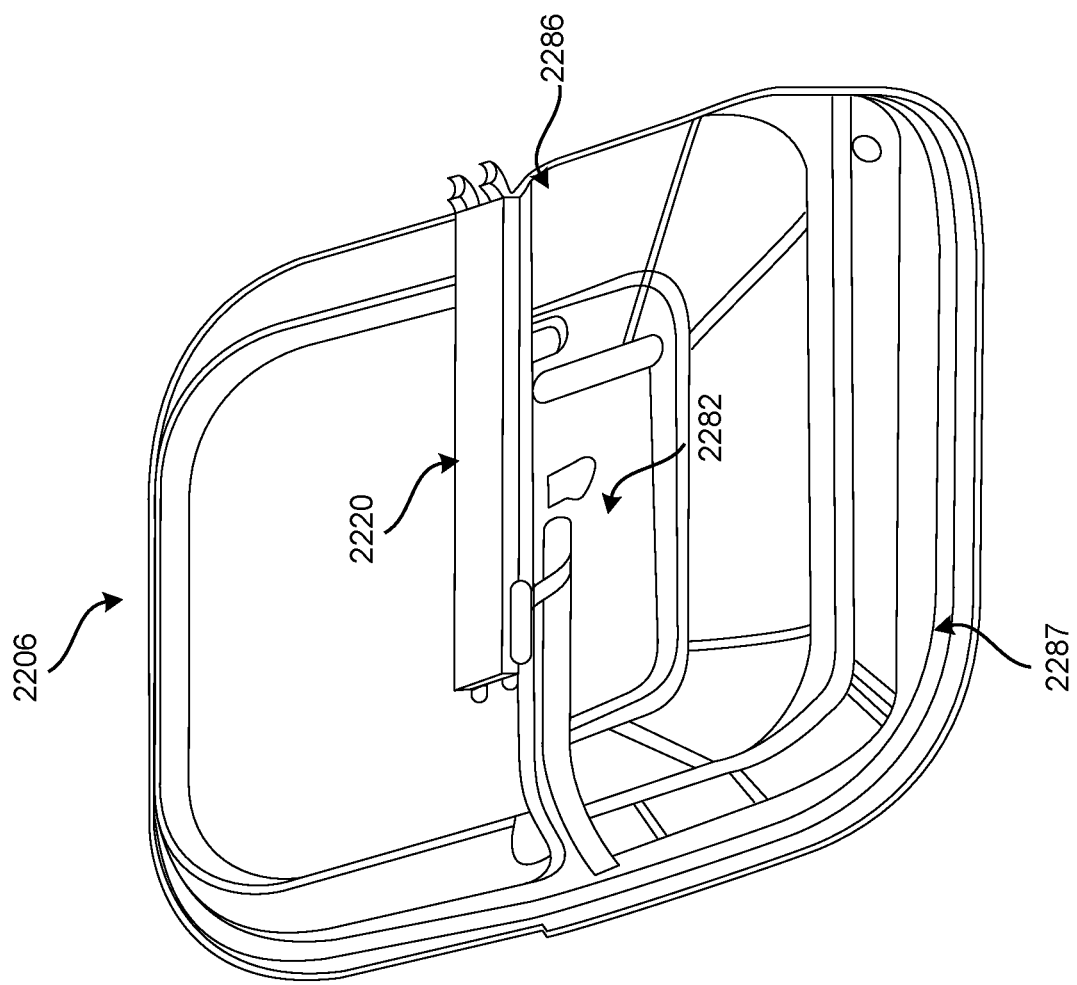
FIG. 22B illustrates an example of rail covers for an illustrative sliding door in an open position.

FIGS. 22A and 22B illustrate rail covers 2282 and 2286 according to an example. A consequence of implementing a secondary guide rail on the door may be that it creates an exposed slot on the inside of the door 2206, which is not preferred from a styling perspective. The implementation of a cover panel may be a solution for mitigating the styling impact and reduce risk of debris or other objects from entering the exposed slot and obstructing door travel. However, a mechanism can be implemented for moving this panel out of the way of the rear arm assembly when the door is in motion. Furthermore, this system can be mechanical in the event the vehicle loses power since it should not preclude door functionality. Front rail cover 2282 may cover front portion of door roller rail when door 2206 is in the closed position. Rear rail cover 2286 may cover rear portion of door roller rail 2220 when door 2206 is in the closed position. Front and rear rail covers may move out of the way of the rear arm and may be concealed behind the door trim 2287 when the door 2206 is in the open position.

Figure 23:
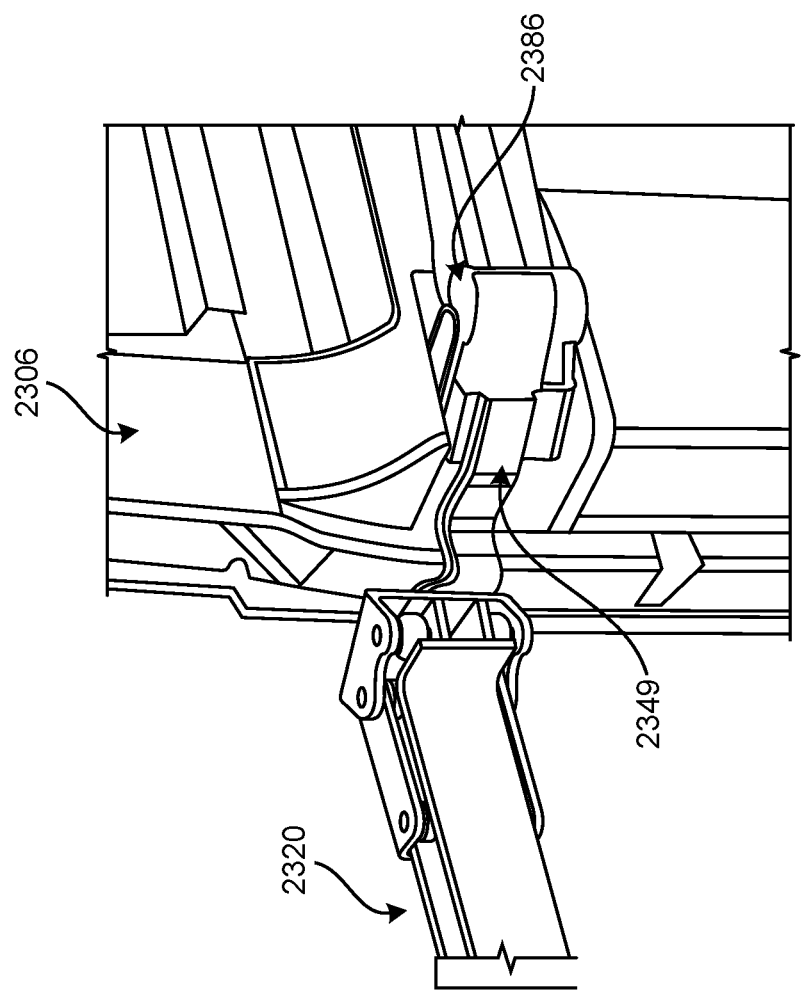
FIG. 23 illustrates an example of a rear rail cover for an illustrative sliding door.
Figure 24:
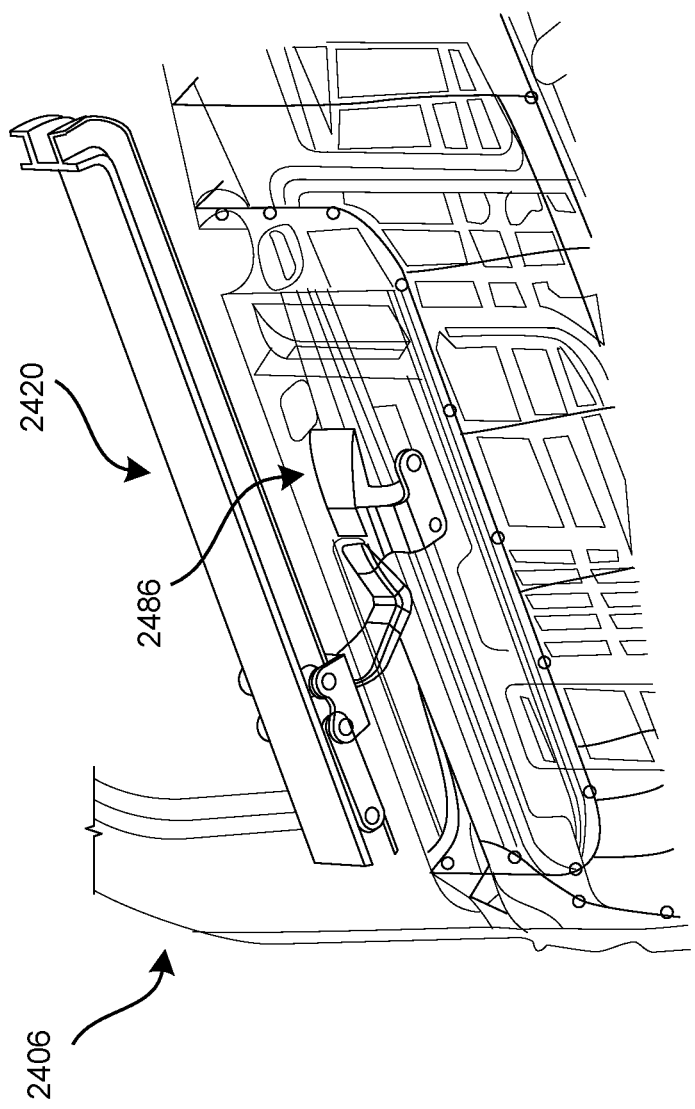
FIG. 24 illustrates an example of rail covers for an illustrative sliding door.

FIG. 23 illustrates deployment of rear rail cover 2386 according to an example. Rear rail cover 2386 may be attached to the rear arm 2349 and may cover the rear most portion of the door roller rail 2320 of the door 2306. If it is rigidly attached to the rear arm assembly, it may follow the motion of the arm. As shown in FIG. 24, rear rail cover 2486 may pass behind interior door trim of the door 2406 utilizing the door roller rail 2420.

Figure 25A:
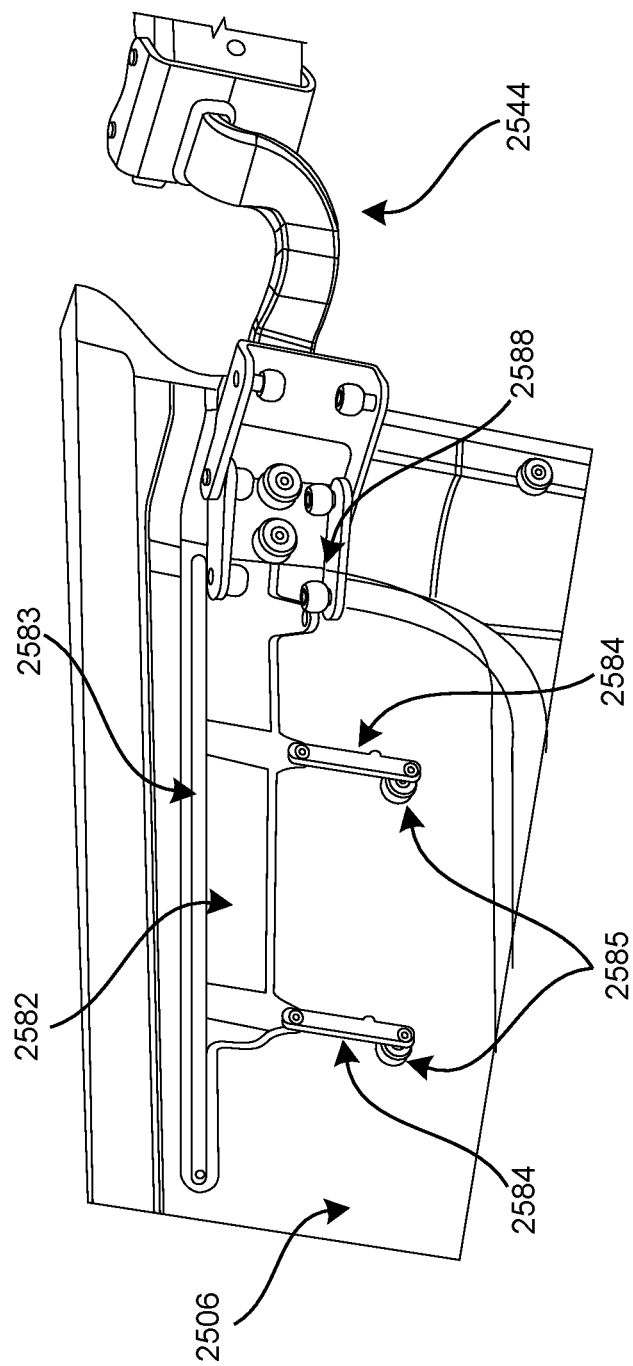
FIG. 25A illustrates an example of a front rail cover for an illustrative sliding door in a closed position.
Figure 25B:
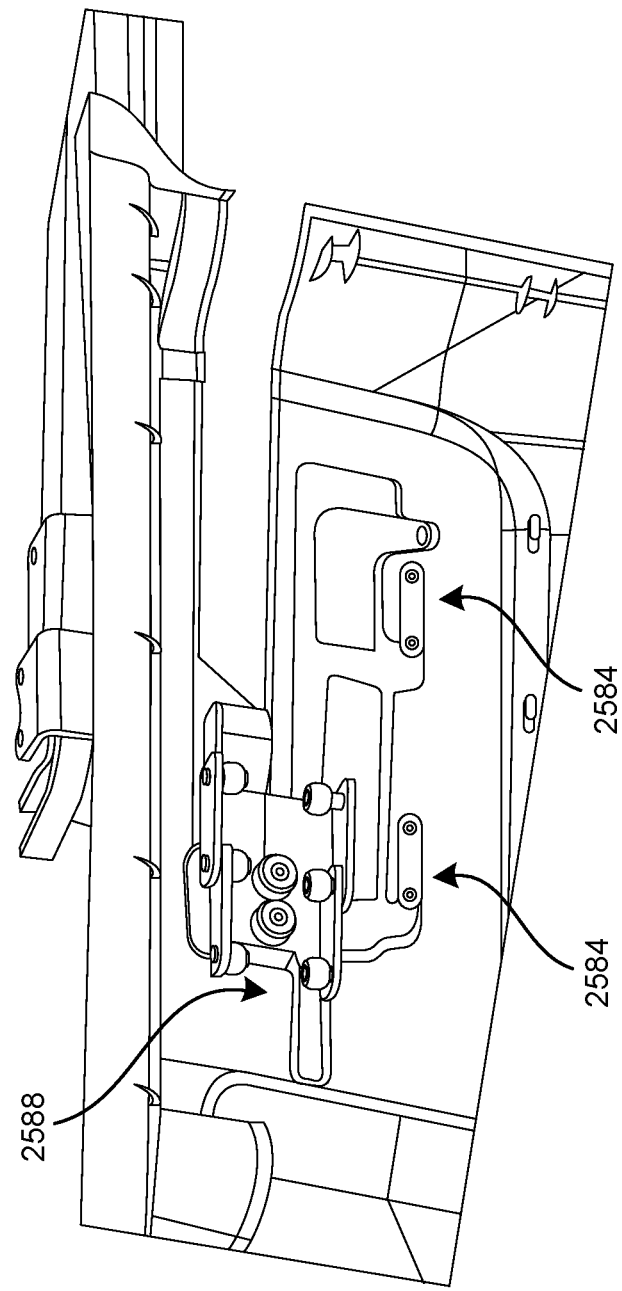
FIG. 25B illustrates an example of a front rail cover for an illustrated sliding door in an open position.

FIGS. 25A and 25B illustrate deployment of front rail cover 2582 according to an example. The front rail cover mechanism may utilize a set of pivot arms 2584 that may rotate about pivot bosses 2585 mounted to the interior door trim. These pivot arms 2584 may control the motion of the front rail cover 2582 when it is pushed forward by a pushing roller 2588 located on the door roller carrier. The pushing roller 2588 may ride along an "L" shaped ridge 2583 on the outboard side of the front rail cover 2582. The vertical component of this ridge may force the front rail cover 2582 forward when door 2506 moves rearward relative to the rear arm. Once the front rail cover 2582 is rotated forward, the roller 2588 may ride on the horizontal portion of the ridge 2583 keeping it down and out of the way of the arm assembly. Torsions springs acting on the pivot arms 2584 may help return the front rail cover 2582 back to the initial position when the door 2506 is closed.

FIGS. 26A-26G are illustrations of the operation of a sliding door according to an example. FIGS. 26A-26G are sequential and show a movement of a sliding door 2606 from its fully open position (illustrated in FIG. 26A) to its fully closed position (illustrated in FIG. 26G). FIGS. 26A-26G also show a movement of a front arm 2610 along a front rail 2608, a movement of rear rail roller carrier 2651 along a rear rail 2620, and a movement of a door rail roller carrier 2645 along a door rail 2632.

Figure 26A:
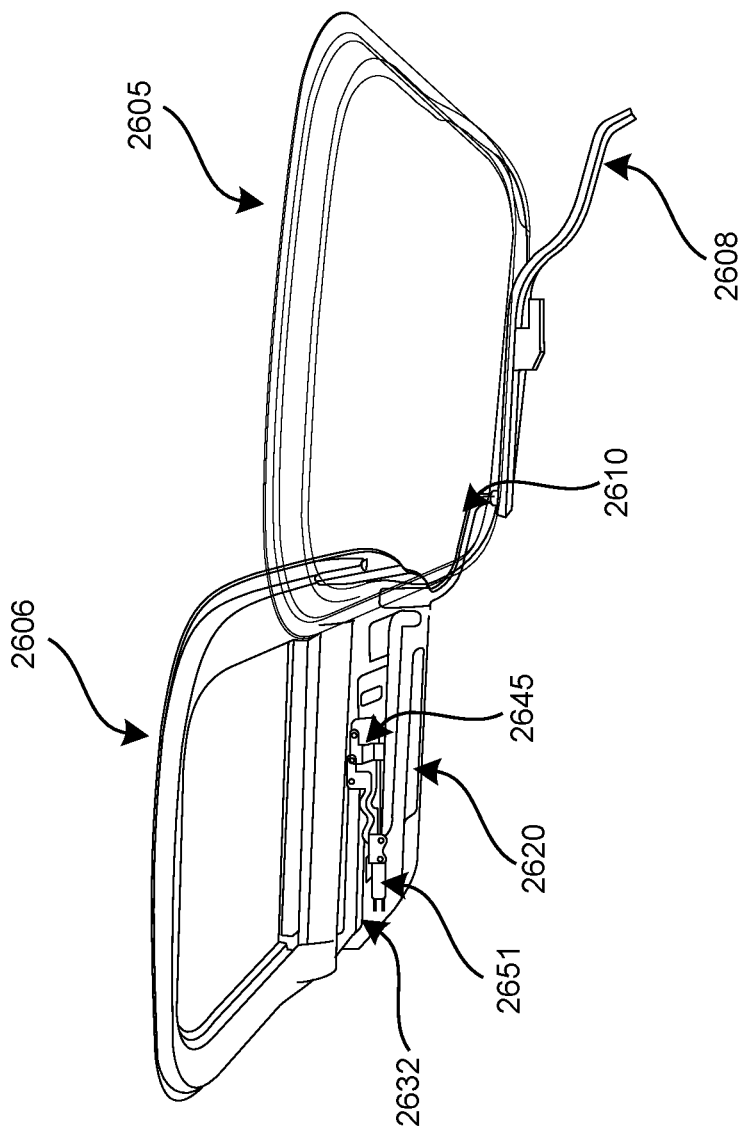
FIG. 26A illustrates an example of an illustrative sliding door in a fully open position.

FIG. 26A shows a sliding door 2606 in a fully open position. In this position, a door opening in a vehicle body 2605 may be completely unobstructed. A front arm 2610 may have travelled to the rear most position on a front rail 2608. A rear rail roller carrier 2651 may have travelled to a rear most position on a rear rail 2620. At the same time, a door rail roller carrier 2645 may be at a forward most position on a door rail 2632.

Figure 26B:
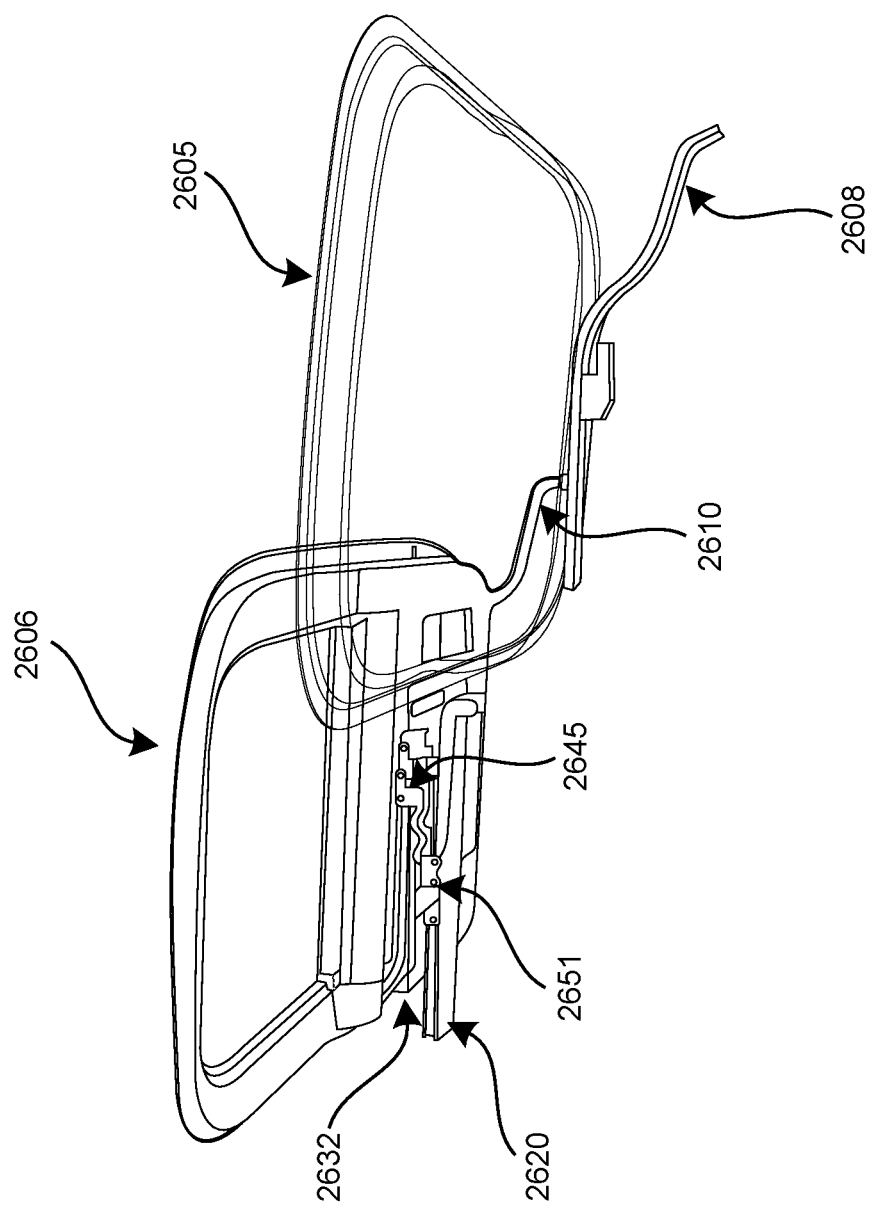
FIG. 26B illustrates an example of an illustrative sliding door moved away from a fully open position as the sliding door starts to close.

FIG. 26B shows the sliding door 2606 as it started to close, and therefore moved away from its fully open position shown in FIG. 26A. In this intermediate position, the front arm 2610 may have moved away from the rear most position on the front rail 2608. The rear rail roller carrier 2651 may have moved away from the rear most position on the rear rail 2620. At the same time, the door rail roller carrier 2645 may have stayed at the forward most position on the door rail 2632.

Figure 26C:
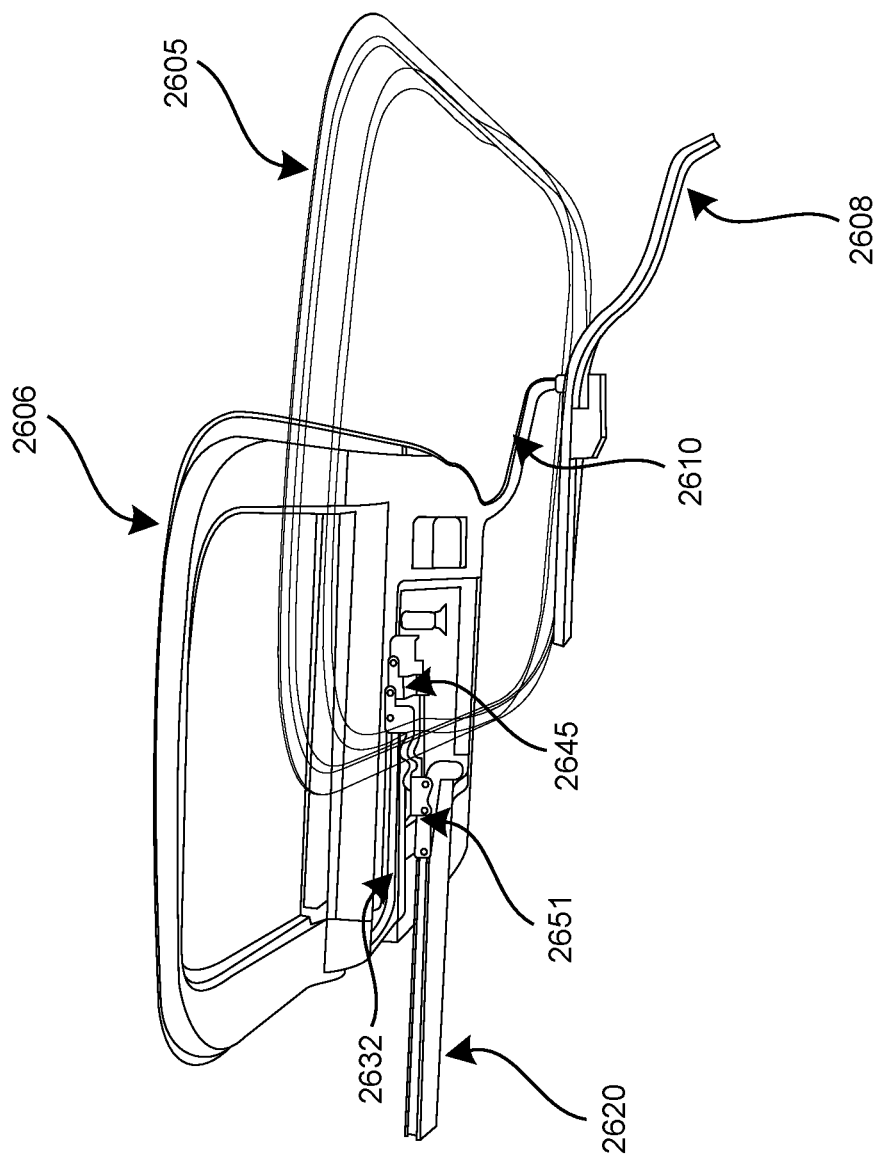
FIG. 26C illustrates an example of an illustrative sliding door between a fully open position and a fully closed position.

FIG. 26C shows the sliding door 2606 farther along on its way from a fully open to a fully closed position. In this position, the rear rail roller carrier 2651 moved all the way forward along a straight portion of the rear rail 2620. Once the rear rail roller carrier 2651 moved all the way forward along the straight portion of the rear rail 2620, door rail roller carrier 2645 may start moving rearward along the door rail 2632. In the meantime, the front arm 2610 may continue to travel forward along the front rail 2608.

Figure 26D:
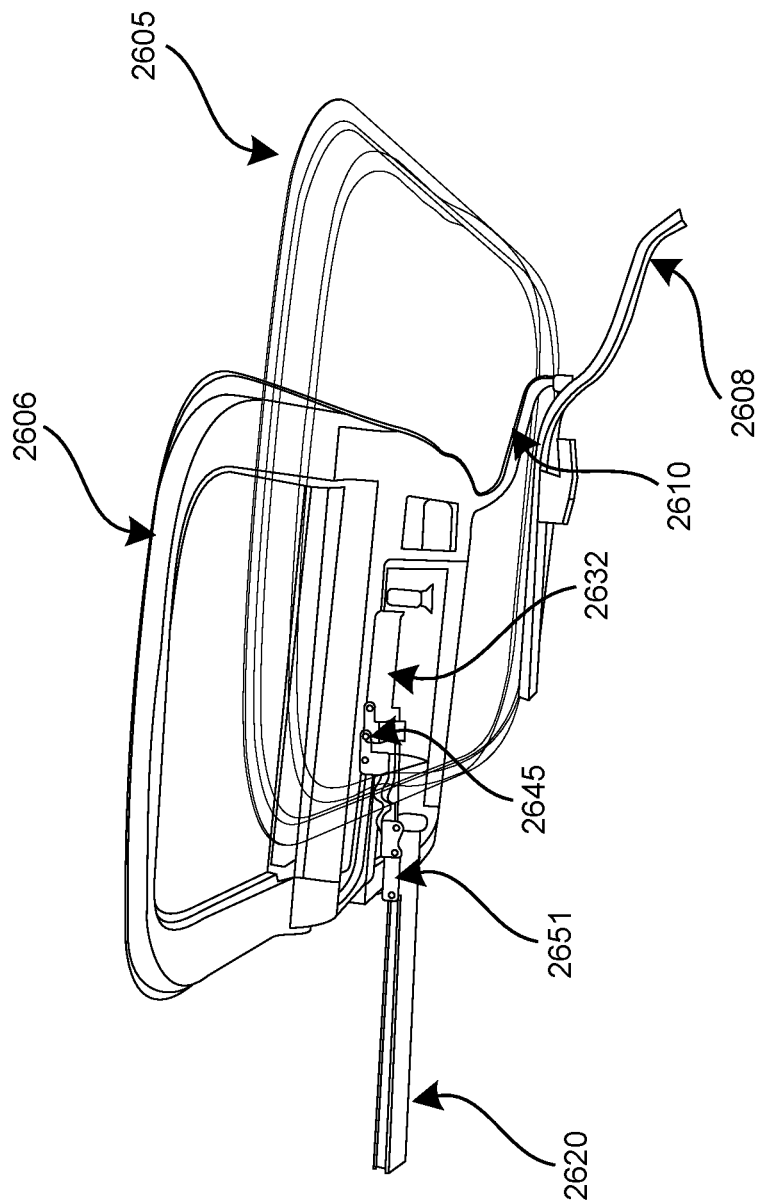
FIG. 26D illustrates an example of an illustrative sliding door between a fully open position and a fully closed position and partially pivoted towards an associated vehicle.

Along a portion of its travel illustrated in FIGS. 26A-26C, the sliding door 2606 continues to be substantially parallel to the vehicle body 2605. FIG. 26D illustrates how the sliding door 2606 may start to pivot toward the vehicle body 2605. This pivot may be controlled by a shape of the front rail 2608. Specifically, once the front arm 2610 reaches a rear most bend in the front rail 2608, the front of the sliding door 2606 may start to pivot toward the vehicle body 2605. The rear rail roller carrier 2651 may continue to stay at the forward most position along the straight portion of the rear rail 2620. The door rail roller carrier 2645 may continue to travel rearward along the door rail 2632.

Figure 26E:
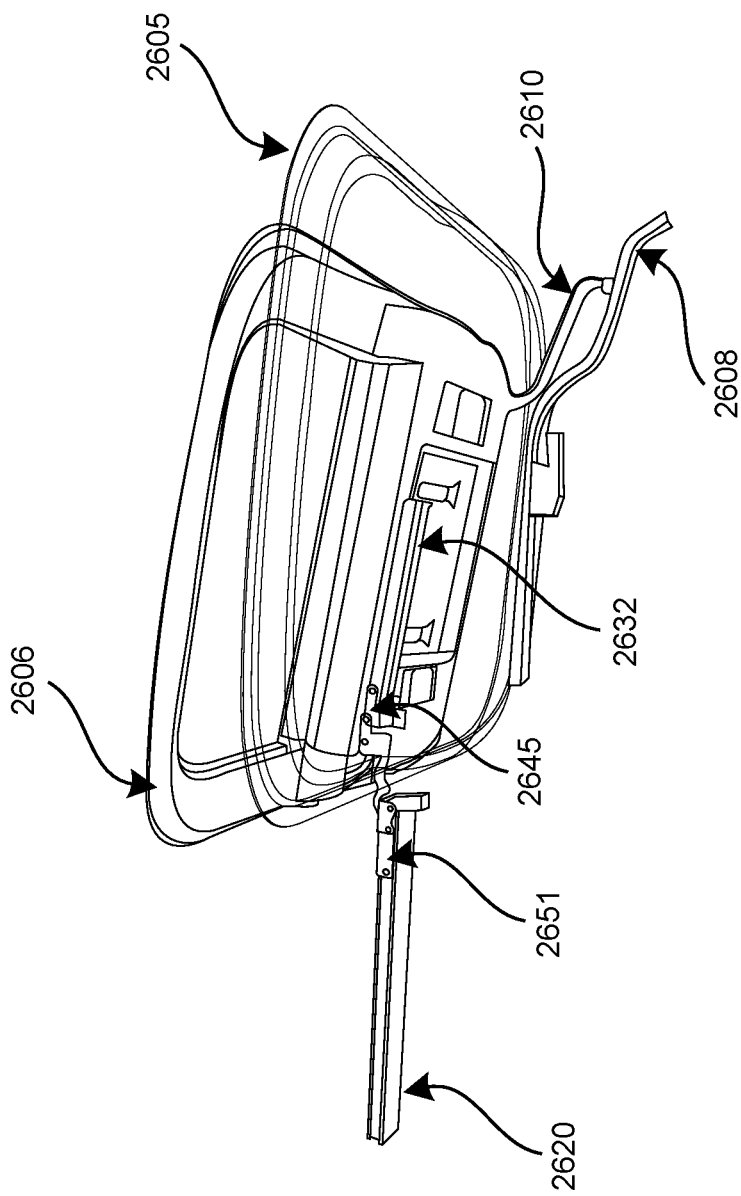
FIG. 26E illustrates an example of an illustrative sliding door between a fully open position and a fully closed position showing a door rail roller carrier at a rear most position along a door rail.

FIG. 26E shows the sliding door 2606 at a pint where the door rail roller carrier 2645 has reached the rear most position along the door rail 2632. At this point, rear rail roller carrier 2651 may continue to be positioned at the forward most position along the straight portion of the rear rail 2620, while the front arm 2610 may continue to travel forward along the front rail 2608.

Figure 26F:
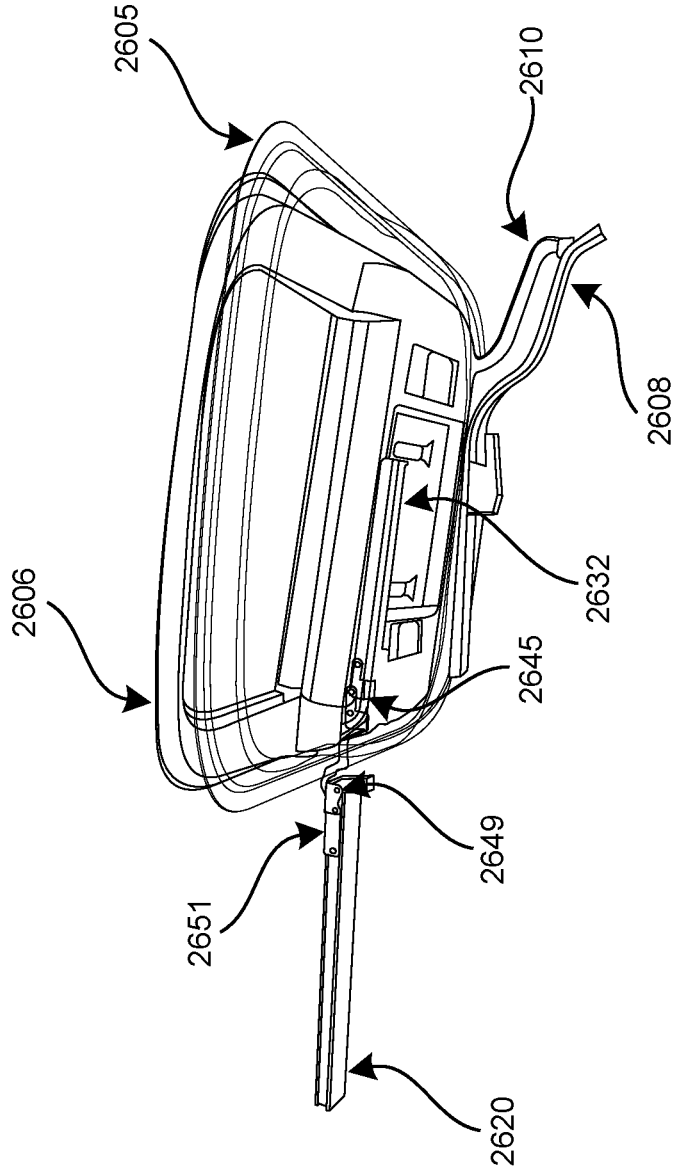
FIG. 26F illustrates an example of an illustrative sliding door in a partially open position.

As the sliding door 2606 continues to move forward and at the same time closer to the vehicle body 2605, FIG. 26F illustrates that a rear arm 2649 may start to pivot with respect to the rear rail roller carrier 2651. This may allow the sliding door 2606 to move closer to the vehicle body 2605. The front arm 2610 may continue to travel forward along the front rail 2608.

Figure 26G:
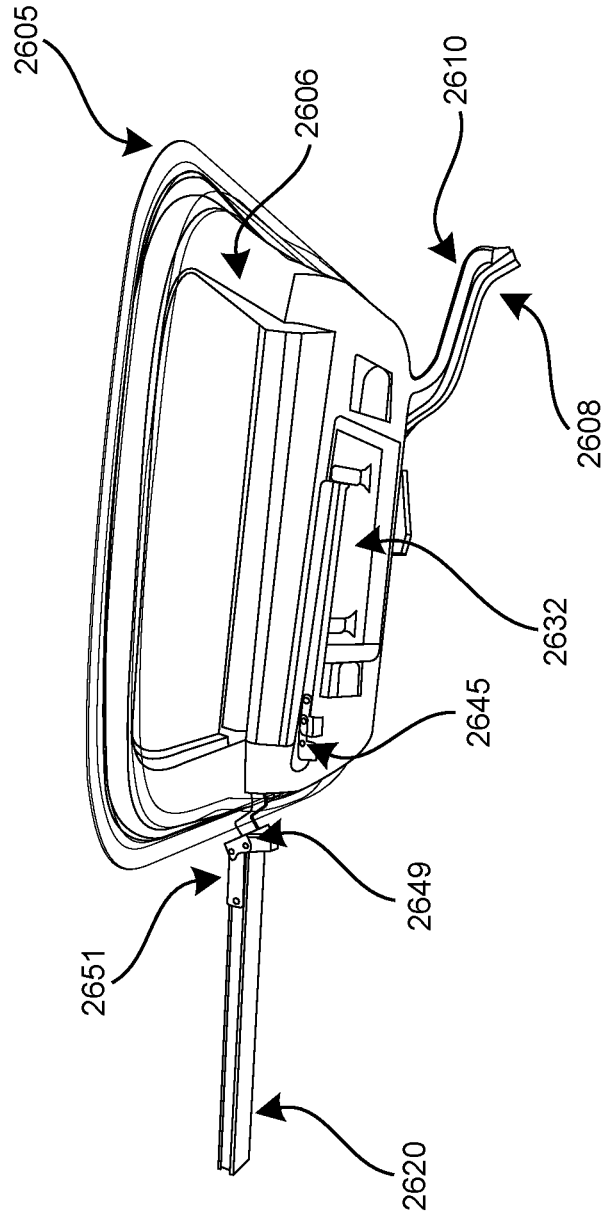
FIG. 26G illustrates an example of an illustrative sliding door in a fully closed position.

FIG. 26G illustrates the sliding door 2606 at the end of its travel toward its fully closed position. In the fully closed position, the rear arm 2649 may have reached the forward most position along the rear rail 2620, while the front arm 2610 may have reached the forward most position along the front rail 2608. The sliding door 2606 may now be fully closed and in contact with the vehicle body 2605. The opening of the sliding door 2606 from its fully closed position (as illustrated in FIG. 26G) to its fully open position (as illustrated in FIG. 26A) may proceed along the same steps in reverse.

Figure 27A:
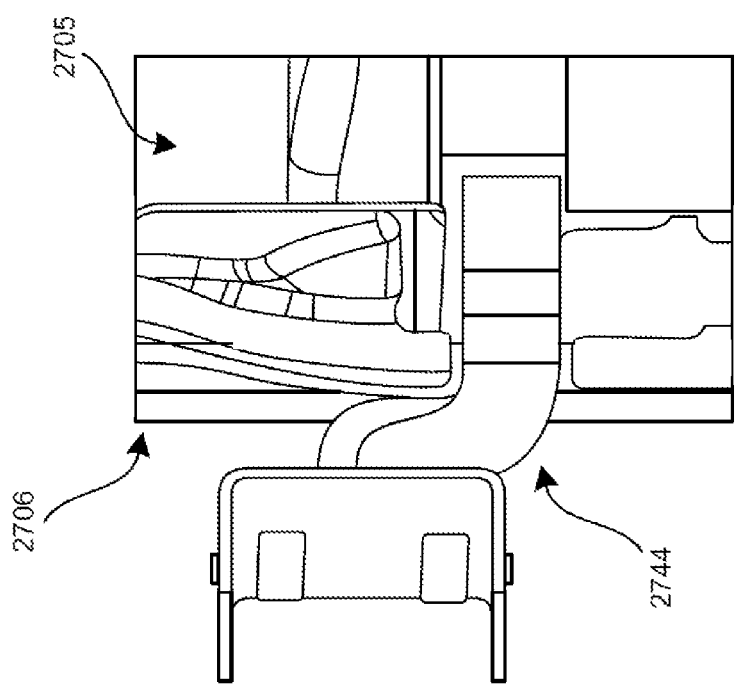
FIG. 27A illustrates an example of an illustrative sliding door positioned near a rear arm assembly.
Figure 27B:
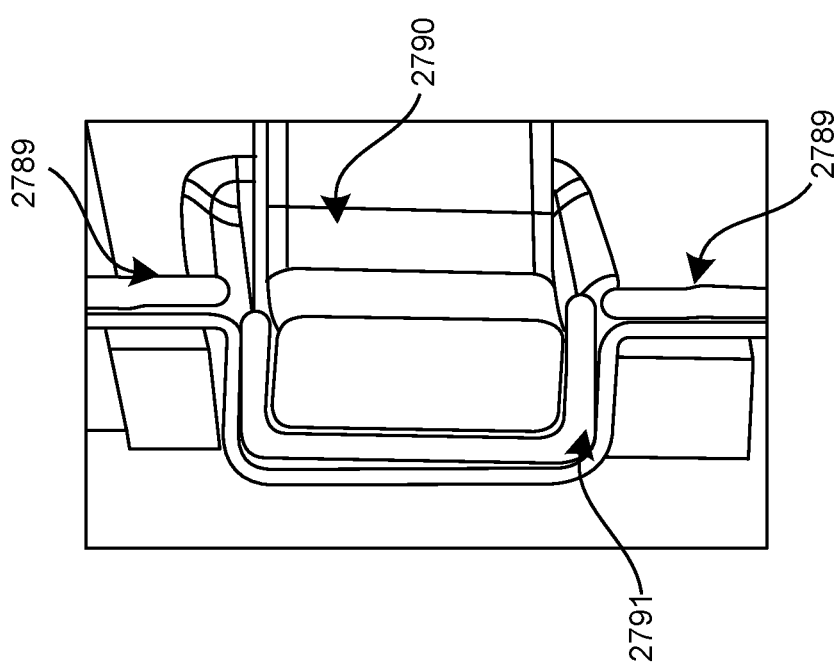
FIG. 27B illustrates a perpendicular view of the sliding door of FIG. 27A showing an illustrative sealing arrangement associated with the sliding door.

Another consequence of implementing the door roller rail is that it may pose a challenge for the door seal interface, specifically in the area of the rear arm. The motion of the rear arm assembly along the door roller rail may not allow for an uninterrupted seal around the perimeter of the door as found on a conventional sliding door. FIGS. 27A and 27B illustrate an illustrative arrangement to address this issue according to an example. FIG. 27A shows an example of a sliding door 2706 near a rear arm assembly 2744. FIG. 27B shows a view perpendicular to a plane of FIG. 27A. A sealing arrangement may include a seal 2789 between a door 2706 and a vehicle body 2705, a seal 2790 between rear arm assembly 2744 and vehicle body 2705, and a seal 2791 between a rear arm assembly 2744 and a door 2706.

It will be appreciated in light of the disclosure above that an illustrative dual-guide-rail sliding door system for an automotive vehicle may comprise a sliding door, a front rail connectable to a body of the vehicle, a rear rail connectable to a body of the vehicle rearward of the front rail, a door rail connectable to the sliding door, a front arm assembly connectable to the sliding door and movably connectable to the front rail, and a rear arm assembly movably connectable to the rear rail and movably connectable to the door rail, such that the sliding door is movably connectable to the body of the vehicle. The system may be configured such that a lateral distance travelled by the sliding door along the body of the vehicle from an open position to a closed position is greater than a length of the rear rail. The system may be configured such that a length of the sliding door is greater than a rear panel length of the vehicle between a rear edge of a door opening and a rear end of the vehicle, the sliding door being configured to open so as to fully expose the door opening. According to an example, the rear rail may be curved, the door rail may be curved, and/or the front rail may be curved.

According to an example, the rear rail may comprise a middle channel of the rear rail, the middle channel of the rear rail at least partially supporting a weight of the sliding door, a top channel of the rear rail, and a bottom channel of the rear rail, wherein the top and bottom channels of the rear rail constrain lateral and fore-aft motion of the rear arm assembly. According to an example, the door rail may comprise a middle channel of the door rail, the middle channel of the door rail at least partially supporting a weight of the sliding door, a top channel of the door rail, and a bottom channel of the door rail, wherein the top and bottom channels of the door rail constrain a lateral motion and a fore-aft motion of the sliding door.

According to an example, the rear arm assembly may comprise a door-rail roller, a rear-rail roller, and a rear arm rotatably connected to the door-rail roller and rotatably connected to the rear-rail roller. According to an example, the door rail roller may comprise a door-rail-roller carrier bracket, at least one middle roller of the door rail roller rotatably connected to the door-rail-roller carrier bracket, at least one top roller of the door rail roller rotatably connected to the door-rail-roller carrier bracket, and at least one bottom roller of the door rail roller rotatably connected to the door-rail-roller carrier bracket.

According to an example, the rear-rail roller may comprise a rear-rail-roller carrier bracket, at least one middle roller of the rear rail roller rotatably connected to the rear-rail-roller carrier bracket, at least one top roller of the rear rail roller rotatably connected to the rear-rail-roller carrier bracket, and at least one bottom roller of the rear rail roller rotatably connected to the rear-rail-roller carrier bracket. According to an example, the front rail may comprise a first bend to guide the sliding door, a second bend to control a lateral travel of the sliding door, and a zone between the first bend and the second bend for packaging a structural pillar forward of the sliding door. According to an example, the front rail may comprise a top channel to control a lateral motion and a fore-aft motion of the front arm assembly, and a lower lip to support a partial weight of the sliding door.

According to an example, the front arm assembly may comprise a front arm, and a front-rail roller rotatably connected to the front arm. According to an example, the front roller may comprise a front roller carrier bracket, at least one bottom roller of the front roller rotatably connected to the front roller carrier bracket, and at least one top roller of the front roller rotatably connected to the front roller carrier bracket. According to an example, the system may comprise an electrical drive assembly attached to the front rail. According to an example, the electrical drive assembly may comprise an electric drive unit, a plurality of guide pulleys, a wire guide, and a drive wire, the drive wire passing through the electric drive unit, the plurality of guide pulleys, and the wire guide.

According to an example, the front roller carrier bracket may comprise an attachment for the electric drive assembly and wherein the drive wire passes through the attachment. According to an example, the system may comprise a front rail cover to cover a front portion of the door rail when the sliding door is in a closed position, and a rear rail cover to cover a rear portion of the door rail when the sliding door is in a closed position, the rear rail cover fixedly attached to the rear arm assembly. According to an example, the system may comprise at least one pivot boss on the sliding door, at least one pivot arm, each pivot arm rotatably connected to the at least one pivot boss and rotatably connected to the front rail cover, an L-shaped roller ridge on the front rail cover, and a pushing roller on the rear arm assembly, wherein during opening of the sliding door, the pushing roller is configured to move along the L-shaped roller ridge to push the front rail cover out of the way of the rear arm assembly. According to an example, the system may comprise a first seal between the sliding door and the body of the vehicle, a second seal between the sliding door and the rear arm assembly, and a third seal between the body of the vehicle and the rear arm assembly. According to an example, the system may include any suitable door latching mechanisms including mechanical door latching mechanisms and locks, electromechanical latching mechanisms, combinations thereof, etc., such as those conventionally known to those of skill in the art.

The illustrative sliding door systems described herein include a variety of components including rails, brackets, rollers, fixed and rotatable connection mechanisms, latching mechanisms, etc. Such components may be fabricated using suitable materials such as steel alloys, aluminum alloys, composite materials, polymeric materials, etc., of suitable strength and dimensions to provide secure and reliable assemblies, and the particular selection of materials and size of components is within the purview of one of ordinary skill in the art. Such components may be fabricated using any suitable techniques such as extrusion, stamping, bending, casting, machining, etc., as will be appreciated by those of ordinary skill in the art. Attachments and connections may be made using any suitable means such as fasteners including bolts, screws, rivets, etc., welds, slotted connections, etc., or any combination thereof, as will be appreciated by those of skill in the art.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. It should also be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply. In addition, as used in the description herein and throughout the claims that follow, the meaning of "about" and/or "approximately" refers to ±10% of the quantity indicated, unless otherwise indicated. In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. Other implementations may be within the scope of the following claims.

While the disclosed subject matter has been described in terms of illustrative embodiments, it will be understood by those skilled in the art that various modifications can be made thereto without departing from the scope of the claimed subject matter as set forth in the claims.

What is claimed is:

1. An automotive vehicle, comprising:
   a body;
   a sliding door;
   a front rail connected to the body;
   a rear rail connected to the body rearward of the front rail;
   a door rail connected to the sliding door;
   a front arm assembly connected to the sliding door and movably connected to the front rail; and
   a rear arm assembly movably connected to the rear rail and movably connected to the door rail, the rear arm assembly comprising a rear-rail-roller carrier bracket, a door-rail-roller carrier bracket, and a rear arm rotatably connected to the door-rail-roller carrier bracket and rotatably connected to the rear-rail-roller carrier bracket, wherein the rear-rail-roller carrier bracket defines a first U-shaped profile in cross section and includes at least one rear-rail roller rotatably connected to the rear-rail-roller carrier bracket and positioned within the first U-shaped profile, and wherein the door-rail-roller carrier bracket defines a second U-shaped profile in cross section and includes at least one door-rail roller rotatably connected to the door-rail-roller carrier bracket and positioned within the second U-shaped profile,
   the sliding door being movably connected to the body, and
   a lateral distance travelled by the sliding door along the body from a fully open position to a closed position being greater than a length of the rear rail,
   the sliding door being configured to open so as, in the fully open position, to fully expose a door opening in the body for the sliding door with the sliding door being positioned rearward of a rear edge of the door opening, and the sliding door, in the fully open position, extending beyond a rear end of a rear end side panel of the body.

2. The vehicle of claim 1, wherein the rear rail is curved.

3. The vehicle of claim 2, wherein the rear rail comprises:
   a middle channel of the rear rail, the middle channel of the rear rail at least partially supporting a weight of the sliding door;
   a top channel of the rear rail; and
   a bottom channel of the rear rail,
   wherein the top and bottom channels of the rear rail constrain lateral and fore-aft motion of the rear arm assembly.

4. The vehicle of claim 1, wherein the at least one door-rail roller comprises:
   at least one middle roller rotatably connected to the door-rail-roller carrier bracket;
   at least one top roller rotatably connected to the door-rail-roller carrier bracket; and
   at least one bottom roller rotatably connected to the door-rail-roller carrier bracket.

5. The vehicle of claim 1, wherein the at least one rear-rail roller comprises:
   at least one middle roller rotatably connected to the rear-rail-roller carrier bracket;
   at least one top roller rotatably connected to the rear-rail-roller carrier bracket; and
   at least one bottom roller rotatably connected to the rear-rail-roller carrier bracket.

6. The vehicle of claim 1, wherein the front rail is curved.

7. The vehicle of claim 6, wherein the front rail comprises:
a first bend to guide the sliding door;
a second bend to control a lateral travel of the sliding door;
a zone between the first bend and the second bend for receiving a structural pillar forward of the door opening.

8. The vehicle of claim 6, wherein the front rail comprises:
a top channel to control a lateral motion and a fore-aft motion of the front arm assembly; and
a lower lip to support a partial weight of the sliding door.

9. The vehicle of claim 1, further comprising:
a front rail cover to cover a front portion of the door rail when the sliding door is in the closed position; and
a rear rail cover to cover a rear portion of the door rail when the sliding door is in the closed position,
the rear rail cover attached to the rear arm assembly.

10. The vehicle of claim 1, wherein the front arm assembly comprises:
a front arm; and
front-roller-carrier bracket rotatably connected to the front arm, the front-roller-carrier bracket includes at least one front-rail roller rotatably connected to the front-roller-carrier bracket.

11. The vehicle of claim 10, wherein the at least one front-rail roller comprises:
at least one bottom roller rotatably connected to the front-roller-carrier bracket; and
at least one top roller rotatably connected to the front-roller-carrier bracket.

12. The vehicle of claim 11, further comprising an electrical drive assembly attached to the front rail.

13. The vehicle of claim 12, wherein the electrical drive assembly comprises:
an electric drive unit;
a plurality of guide pulleys;
a wire guide;
a drive wire,
the drive wire passing through the electric drive unit and the wire guide.

14. The vehicle of claim 13, wherein the front-roller-carrier bracket comprises an attachment for the electrical drive assembly and wherein the drive wire passes through the attachment.

15. The vehicle of claim 1, further comprising:
a first seal between the sliding door and the body of the vehicle;
a second seal between the sliding door and the rear arm assembly; and
a third seal between the body of the vehicle and the rear arm assembly.

16. An automotive vehicle, comprising:
a body;
a sliding door;
a front rail connected to the body;
a rear rail connected to the body rearward of the front rail;
a door rail connected to the sliding door;
a front arm assembly connected to the sliding door and movably connected to the front rail; and
a rear arm assembly movably connected to the rear rail and movably connected to the door rail, the rear arm assembly comprising a rear-rail-roller carrier bracket, a door-rail-roller carrier bracket, and a rear arm rotatably connected to the door-rail-roller carrier bracket and rotatably connected to the rear-rail-roller carrier bracket, wherein the rear-rail-roller carrier bracket defines a first U-shaped profile in cross section and includes at least one rear-rail roller rotatably connected to the rear-rail-roller carrier bracket and positioned within the first U-shaped profile, and wherein the door-rail-roller carrier bracket defines a second U-shaped profile in cross section and includes at least one door-rail roller rotatably connected to the door-rail-roller carrier bracket and positioned within the second U-shaped profile,
the sliding door being movably connected to the body, and
a length of the sliding door being greater than a length of a rear end side panel length of the body of the vehicle which extends between a rear edge of a door opening in the body for the sliding door and a rear end of the rear end side panel of the body,
the sliding door being configured to open so as, in a fully open position, to fully expose the door opening with the sliding door being positioned rearward of the rear edge of the door opening, and the sliding door, in the fully open position, extending beyond the rear end of the rear end side panel of the body.

17. A dual-guide-rail sliding door system for an automotive vehicle, comprising:
a sliding door;
a front rail connectable to a body of the vehicle;
a rear rail connectable to the body rearward of the front rail;
a door rail connectable to the sliding door;
a front arm assembly connectable to the sliding door and movably connectable to the front rail; and
a rear arm assembly movably connected to the rear rail and movably connected to the door rail, the rear arm assembly comprising a rear-rail-roller carrier bracket, a door-rail-roller carrier bracket, and a rear arm rotatably connected to the door-rail-roller carrier bracket and rotatably connected to the rear-rail-roller carrier bracket, wherein the rear-rail-roller carrier bracket defines a first U-shaped profile in cross section and includes at least one rear-rail roller rotatably connected to the rear-rail-roller carrier bracket and positioned within the first U-shaped profile, and wherein the door-rail-roller carrier bracket defines a second U-shaped profile in cross section and includes at least one door-rail roller rotatably connected to the door-rail-roller carrier bracket and positioned within the second U-shaped profile,
the sliding door being movably connectable to the body,
a lateral distance travelled by the sliding door along the body from a fully open position to a closed position being greater than a length of the rear rail,
the sliding door being configured to open so as, in the fully open position, to fully expose a door opening in the body for the sliding door with the sliding door being positioned rearward of a rear edge of the door opening, and the sliding door, in the fully open position, extending beyond a rear end of a rear end side panel of the body.

18. A dual-guide-rail sliding door system for an automotive vehicle, comprising:
a sliding door;
a front rail connectable to a body of the vehicle;
a rear rail connectable to the body rearward of the front rail;
a door rail connectable to the sliding door;

a front arm assembly connectable to the sliding door and movably connectable to the front rail; and a rear arm assembly movably connected to the rear rail and movably connected to the door rail, the rear arm assembly comprising a rear-rail-roller carrier bracket, a door-rail-roller carrier bracket, and a rear arm rotatably connected to the door-rail-roller carrier bracket and rotatably connected to the rear-rail-roller carrier bracket, wherein the rear-rail-roller carrier bracket defines a first U-shaped profile in cross section and includes at least one rear-rail roller rotatably connected to the rear-rail-roller carrier bracket and positioned within the first U-shaped profile, and wherein the door-rail-roller carrier bracket defines a second U-shaped profile in cross section and includes at least one door-rail roller rotatably connected to the door-rail-roller carrier bracket and positioned within the second U-shaped profile, a length of the sliding door being greater than a length of a rear end side panel of the body of the vehicle which extends between a rear edge of a door opening in the body for the sliding door and a rear end of the rear end side panel of the body, the sliding door being configured to open so as, in a fully open position, to fully expose the door opening with the sliding door being positioned rearward of the rear edge of the door opening, and the sliding door, in the fully open position, extending beyond the rear end of the rear end side panel of the body.

\* \* \* \* \*